United States Patent
Fair

(10) Patent No.: US 7,334,094 B2
(45) Date of Patent: *Feb. 19, 2008

(54) ONLINE CLONE VOLUME SPLITTING TECHNIQUE

(75) Inventor: Robert L. Fair, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 10/836,111

(22) Filed: Apr. 30, 2004

(65) Prior Publication Data

US 2005/0246503 A1    Nov. 3, 2005

(51) Int. Cl.
*G06F 12/16* (2006.01)

(52) U.S. Cl. ...................................... 711/161

(58) Field of Classification Search ........... 711/112, 711/161; 707/202, 203, 10, 204; 709/217
See application file for complete search history.

(56) References Cited

U.S. PATENT DOCUMENTS

| | | | |
|---|---|---|---|
| 4,156,907 | A | 5/1979 | Rawlings et al. |
| 4,399,503 | A | 8/1983 | Hawley |
| 4,570,217 | A | 2/1986 | Allen et al. |
| 4,598,357 | A | 7/1986 | Swenson et al. |
| 4,688,221 | A | 8/1987 | Nakamura et al. |
| 4,698,808 | A | 10/1987 | Ishii |
| 4,761,785 | A | 8/1988 | Clark et al. |
| 4,805,090 | A | 2/1989 | Coogan |
| 4,837,675 | A | 6/1989 | Bean et al. |
| 4,864,497 | A | 9/1989 | Lowry et al. |
| 4,896,259 | A | 1/1990 | Jacobs et al. |
| 4,899,342 | A | 2/1990 | Potter et al. |
| 4,989,206 | A | 1/1991 | Dunphy, Jr. et al. |
| 5,124,987 | A | 6/1992 | Milligan et al. |
| RE34,100 | E | 10/1992 | Hartness |

(Continued)

FOREIGN PATENT DOCUMENTS

EP    1349088 A2    1/2003

(Continued)

OTHER PUBLICATIONS

U.S. Appl. No. 10/837,254, filed Apr. 30, 2004, Edwards et al., entitled Cloning Technique for Efficiently Creating a Copy of a Volume in a Storage System.

(Continued)

*Primary Examiner*—Pierre Bataille
*Assistant Examiner*—Paul Schlie
(74) *Attorney, Agent, or Firm*—Cesari and McKenna LLP

(57) ABSTRACT

A clone splitting technique enables efficient online splitting of blocks shared between a parent virtual volume (vvol) and a clone in accordance with a shared block splitting procedure executing on a storage system. Online splitting of shared blocks denotes allowing execution of read/write operations directed to the clone, as well as to the parent vvol, as the shared blocks are split. The clone splitting technique removes any connection between a clone and its parent vvol, thereby allowing the clone to be used as a first-class volume. Moreover, the technique removes such connection while allowing both the clone and parent vvol to remain available online and writeable (accessible) to clients during the shared block splitting procedure.

29 Claims, 14 Drawing Sheets

U.S. PATENT DOCUMENTS

| | | | |
|---|---|---|---|
| 5,155,835 | A | 10/1992 | Belsan |
| 5,163,131 | A | 11/1992 | Row et al. |
| 5,202,979 | A | 4/1993 | Hillis et al. |
| 5,278,979 | A | 1/1994 | Foster et al. |
| 5,426,747 | A | 6/1995 | Weinreb et al. |
| 5,581,724 | A | 12/1996 | Belsan et al. |
| 5,819,292 | A * | 10/1998 | Hitz et al. ............... 707/203 |
| 5,963,962 | A * | 10/1999 | Hitz et al. ............... 707/202 |
| 6,038,570 | A | 3/2000 | Hitz et al. |
| 6,311,193 | B1 | 10/2001 | Sekido |
| 6,636,879 | B1 | 10/2003 | Doucette et al. |
| 6,721,764 | B2 * | 4/2004 | Hitz et al. ............... 707/202 |
| 6,868,417 | B2 * | 3/2005 | Kazar et al. ............... 707/10 |
| 7,035,881 | B2 * | 4/2006 | Tummala et al. .......... 707/204 |
| 7,085,785 | B2 * | 8/2006 | Sawdon et al. ............ 707/204 |
| 2002/0083037 | A1 | 6/2002 | Lewis et al. |
| 2002/0112022 | A1* | 8/2002 | Kazar et al. ............... 709/217 |
| 2004/0024961 | A1 | 2/2004 | Cochran et al. |

FOREIGN PATENT DOCUMENTS

| | | |
|---|---|---|
| WO | WO 89/10594 | 11/1989 |

OTHER PUBLICATIONS

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, 39(12), Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3):407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{copy of article I have has no date or cite}.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al., *Scale and performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-157.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*,_Technical Report, CSD-87-391, Computer Science Division, Electrical Engineering and Computer Sciences, University of California at Berkeley (1987).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, *The Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M., *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al., *LADDIS: The next generation in NFS file server benchmarking*, USENIX Association Conference Proceedings, Apr. 1993.

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Patterson, D., et al., *A Case for Redundant Arrays of Inexpensive Disks (RAID)*,_Technical Report, CSD-87-391, Computer Science Division, Electrical Engineering and Computer Sciences, University of California at Berkeley 1987.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

"Notification of Transmittal of the International Search Report and the Written Opinion of the International Searching Authority, or the Declaration" for International Application No. PCT/US2005/013414 for International Filing date of Apr. 21, 2005.

\* cited by examiner

ONLINE CLONE VOLUME SPLITTING TECHNIQUE

CROSS-REFERENCE TO RELATED APPLICATIONS

The present invention is related to the following commonly assigned U.S. patent applications Ser. No. 10/827,254 titled, Cloning Technique for Efficiently Creating a Copy of a Volume in a Storage System, filed herewith.

FIELD OF THE INVENTION

The present invention relates to storage systems and, more specifically, to a technique that enables efficient online splitting of blocks shared between a parent volume and a clone volume of a storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n−1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

When accessing a block of a file in response to servicing a client request, the file system specifies a vbn that is translated at the file system/RAID system boundary into a disk block number (dbn) location on a particular disk (disk, dbn) within a RAID group of the physical volume. Each block in the vbn space and in the dbn space is typically fixed, e.g., 4 k bytes (kB), in size; accordingly, there is typically a one-to-one mapping between the information stored on the disks in the dbn space and the information organized by the file system in the vbn space. The (disk, dbn) location specified by the RAID system is further translated by a disk driver system of the storage operating system into a plurality of sectors (e.g., a 4 kB block with a RAID header translates to 8 or 9 disk sectors of 512 or 520 bytes) on the specified disk.

The requested block is then retrieved from disk and stored in a buffer cache of the memory as part of a buffer tree of the file. The buffer tree is an internal representation of blocks for a file stored in the buffer cache and maintained by the file system. Broadly stated, the buffer tree has an inode at the root (top-level) of the file. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The is references to the locations of the file data are provided by pointers, which may further reference indirect blocks that, in turn, reference the data blocks, depending upon the quantity of data in the file. Each pointer may be embodied as a vbn to facilitate efficiency among the file system and the RAID system when accessing the data on disks.

The RAID system maintains information about the geometry of the underlying physical disks (e.g., the number of blocks in each disk) in raid labels stored on the disks. The RAID system provides the disk geometry information to the file system for use when creating and maintaining the vbn-to-disk,dbn mappings used to perform write allocation operations and to translate vbns to disk locations for read operations. Block allocation data structures, such as an active map, a snapmap, a space map and a summary map, are data structures that describe block usage within the file system, such as the write-anywhere file system. These mapping data structures are independent of the geometry and are used by a write allocator of the file system as existing infrastructure for the logical volume.

The RAID system maintains information about the geometry of the underlying physical disks (e.g., the number of blocks in each disk) in raid labels stored on the disks. The RAID system provides the disk geometry information to the file system for use when creating and maintaining the vbn-to-disk,dbn mappings used to perform write allocation operations and to translate vbns to disk locations for read operations. Block allocation data structures, such as an active map, a snapmap, a space map and a summary map, are data structures that describe block usage within the file system, such as the write-anywhere file system. These mapping data structures are independent of the geometry and are used by a write allocator of the file system as existing infrastructure for the logical volume.

The RAID system maintains information about the geometry of the underlying physical disks (e.g., the number of blocks in each disk) in raid labels stored on the disks. The RAID system provides the disk geometry information to the file system for use when creating and maintaining the vbn-to-disk,dbn mappings used to perform write allocation operations and to translate vbns to disk locations for read operations. Block allocation data structures, such as an active map, a snapmap, a space map and a summary map, are data structures that describe block usage within the file system, such as the write-anywhere file system. These mapping data structures are independent of the geometry and are used by a write allocator of the file system as existing infrastructure for the logical volume.

The RAID system maintains information about the geometry of the underlying physical disks (e.g., the number of blocks in each disk) in raid labels stored on the disks. The RAID system provides the disk geometry information to the file system for use when creating and maintaining the vbn-to-disk,dbn mappings used to perform write allocation operations and to translate vbns to disk locations for read operations. Block allocation data structures, such as an active map, a snapmap, a space map and a summary map, are data structures that describe block usage within the file system, such as the write-anywhere file system. These mapping data structures are independent of the geometry and are used by a write allocator of the file system as existing infrastructure for the logical volume.

Specifically, the snapmap denotes a file including a bitmap associated with the vacancy of blocks of a snapshot. The write-anywhere file system (such as the WAFL file system) has the capability to generate a snapshot of its active file system. An "active file system" is a file system to which data can be both written and read, or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the WAFL file system, a PCPI is always an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights.

The active map denotes a file including a bitmap associated with a free status of the active file system. As noted, a logical volume may be associated with a file system; the term "active file system" thus also refers to a consistent state of a current file system. The summary map denotes a file including an inclusive logical OR bitmap of all snapmaps. By examining the active and summary maps, the file system can determine whether a block is in use by either the active file system or any snapshot. The space map denotes a file including an array of numbers that describe the number of storage blocks used in a block allocation area. In other words, the space map is essentially a logical OR bitmap between the active and summary maps to provide a condensed version of available "free block" areas within the vbn space. Examples of snapshot and block allocation data structures, such as the active map, space map and summary map, are described in U.S. Patent Application Publication No. U.S. 2002/0083037 A1, titled Instant Snapshot, by Blake Lewis et al. and published on Jun. 27, 2002, which application is hereby incorporated by reference.

The write-anywhere file system typically performs write allocation of blocks in a logical volume in response to an event in the file system (e.g., dirtying of the blocks in a file). When write allocating, the file system uses the block allocation data structures to select free blocks within its vbn space to which to write the dirty blocks. The selected blocks are generally in the same positions along the disks for each RAID group (i.e., within a stripe) so as to optimize use of the parity disks. Stripes of positional blocks may vary among other RAID groups to, e.g., allow overlapping of parity update operations. When write allocating, the file system traverses a small portion of each disk (corresponding to a few blocks in depth within each disk) to essentially "lay down" a plurality of stripes per RAID group. In particular, the file system chooses vbns that are on the same stripe per RAID group during write allocation using the vbn-to-disk, dbn mappings.

The write-anywhere file system further supports multiple snapshots that are generally created on a regular schedule. Each snapshot refers to a copy of the file system that diverges from the active file system over time as the active file system is modified. In the case of the WAFL file system, the active file system diverges from the snapshots since the snapshots stay in place as the active file system is written to new disk locations. Each snapshot is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various snapshots require extra storage blocks. The multiple snapshots of a storage element are not independent copies, each consuming disk space; therefore, creation of a snapshot on the file system is instantaneous, since no entity data needs to be copied. Read-only accessibility denotes that a snapshot cannot be modified because it is closely coupled to a single writable image in the active file system. The closely coupled association between a file in the active file system and the same file in a snapshot obviates the use of multiple "same" files. In the example of a WAFL file system, snapshots are described in TR3002 *File System Design for a NFS File Server Appliance* by David Hitz et al., published by Network Appliance, Inc. and in U.S. Pat. No. 5,819,292 entitled *Method for Maintaining Consistent States of a File System and For Creating User-Accessible Read-Only Copies of a File System*, by David Hitz et al., each of which is hereby incorporated by reference as though full set forth herein.

Broadly stated, a snapshot is stored on-disk along with the active file system, and is called into the memory of the storage system as requested by the storage operating system. The on-disk organization of the snapshot and the active file system can be understood from the following description of an exemplary file system inode structure 100 shown in FIG. 1. The inode for an inode file 105 contains information describing the inode file associated with a file system. In this exemplary file system inode structure, the inode for the inode file 105 contains a pointer that references (points to) an inode file indirect block 110. The inode file indirect block 110 contains a set of pointers that reference inode file blocks, each of which contains an array of inodes 117, which in turn contain pointers to indirect blocks 119. The indirect blocks 119 include pointers to file data blocks 120A, 120B and 120C. Each of the file data blocks 120(A-C) is capable of storing, e.g., 4 kilobytes (kB) of data.

When the file system generates a snapshot of its active file system, a snapshot inode is generated as shown in FIG. 2. The snapshot inode 205 is, in essence, a duplicate copy of the inode for the inode file 105 of the file system 100 that shares common parts, such as inodes and blocks, with the active file system. For example, the exemplary file system structure 200 includes the inode file indirect blocks 110, inodes 117, indirect blocks 119 and file data blocks 120A-C as in FIG. 1. When a user modifies a file data block, the file system writes the new data block to disk and changes the active file system to point to the newly created block. FIG. 3 shows an exemplary inode file system structure 300 after a file data block has been modified. In this example, file data block 120C is modified to file data block 120C'. As a result, the contents of the modified file data block are written to a new location on disk as a function of the exemplary file system. Because of this new location, the indirect block 319 must be rewritten. Due to this changed indirect block 319, the inode 317 must be rewritten. Similarly, the inode file indirect block 310 and the inode for the inode file 305 must be rewritten.

Thus, after a file data block has been modified the snapshot inode 205 contains a pointer to the original inode file indirect block 110 which, in turn, contains pointers through the inode 117 and indirect block 119 to the original file data blocks 120A, 120B and 120C. The newly written indirect block 319 also includes pointers to unmodified file data blocks 120A and 120B. That is, the unmodified data blocks in the file of the active file system are shared with corresponding data blocks in the snapshot file, with only those blocks that have been modified in the active file system being different than those of the snapshot file.

However, the indirect block 319 further contains a pointer to the modified file data block 120C' representing the new arrangement of the active file system. A new inode for the inode file 305 is established representing the new structure 300. Note that metadata (not shown) stored in any snapshotted blocks (e.g., 205, 110, and 120C) protects these blocks from being recycled or overwritten until they are released from all snapshots. Thus, while the active file system inode for the inode file 305 points to new blocks 310, 317, 319, 120A, 120B and 120C', the old blocks 205, 110 and 120C are retained until the snapshot is fully released.

Snapshots provide a versatile feature that is essential for data recovery operations, such as backup and recovery of storage elements. However, since snapshots are read-only accessible and their contents cannot be modified, their use may be somewhat limited, particularly for operating systems and applications that do not have a notion of a read-only data store (a read-only file system) and that expect to write metadata at any time that the file system is accessible. When a storage element that is held in a snapshot is exported to a client and contains the data for such a problematic file system, an issue arises in that the client attempts to write data to the read-only image. This is a fundamental issue in the design of a reliable system for backups. In general, once a backup image is made (via a mechanism like a snapshot), that image should be inviolate. Modifying a snapshot ("backup") image could have serious consequences in that the data of the snapshot may no longer be a "point-in-time" copy and a consistent image of the storage element data may no longer be available for subsequent recovery operations.

This limitation may be overcome by creating a substantially instantaneous copy of a volume in accordance with a cloning technique as described in U.S. patent application Ser. No. (112055-0155) entitled Cloning Technique for Efficiently Creating a Copy of a Volume in a Storage System, filed herewith. The cloning technique enables efficient creation of a clone volume (copy) of a "parent" virtual volume (vvol) based on a common snapshot. The resulting clone is a "full-fledged" vvol, i.e., it can service storage (read and write) requests and has its own logical properties, such as snapshot operation functionality. Broadly stated, the clone initially shares disk storage with its parent vvol. As write operations are directed to the clone, the disk storage diverges with the clone acquiring its own storage on a block-by-block manner. However, the clone remains tied to the parent vvol through the common base snapshot. The base snapshot is "locked" in the parent to prevent the common blocks from being changed by write operations to the parent vvol. As data is written to the clone, new blocks are allocated in a container file of the clone.

The lifetime of a clone that is linked to its parent vvol may be short, in which case the clone is simply deleted when it is no longer needed. The clone may also have an extended life in which case it is desirable to allow the clone to be split from its parent, making it an independent (non-clone) volume. One way to split the clone from its base snapshot (parent vvol) involves a time consuming process of allocating storage locations for all the blocks in the clone, distinct from the blocks previously shared with the parent vvol, and then copying of those shared blocks from the parent vvol to the allocated storage locations of the clone. In particular, copying entails retrieving all of the blocks from the storage locations of the parent vvol, transporting those blocks to another location and then storing those blocks at the locations of the clone. However, the copying process may be lengthy and time consuming, particularly for large quantities of data (a large volume). Moreover, copying typically takes place "offline", i.e., in a manner such that the parent vvol and clone are inaccessible to clients. This is highly undesirable for clients of a storage system.

SUMMARY OF THE INVENTION

The present invention overcomes the disadvantages of the prior art by providing a clone splitting technique that enables efficient online splitting of blocks shared between a parent virtual volume (vvol) and a clone in accordance with a shared block splitting procedure executing on a storage system. Online splitting of shared blocks denotes allowing execution of read/write operations directed to the clone, as well as to the parent vvol, as the shared blocks are split. The clone splitting technique removes any connection between a clone and its parent vvol, thereby allowing the clone to be used as a "first-class" (i.e., full-fledged) volume. Moreover, the novel technique removes such connection while allowing both the clone and parent vvol to remain available online and writeable (accessible) to clients during the shared block splitting procedure.

According to the inventive technique, a clone scanner examines all inodes of an inode file in the clone. For each inode, the scanner traverses all level one (L1) blocks of an inode buffer tree searching for all level zero (L0) blocks that are not owned by the clone; any such L0 blocks are marked "dirty" for write operations. An owner map is used to determine whether each specific block in the clone is owned by the parent vvol or the clone. Only blocks not owned by the clone are candidates for splitting. Notably, write operations issued by clients and directed to the clone are processed during the splitting of shared blocks because such write operations facilitate the shared block splitting procedure.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
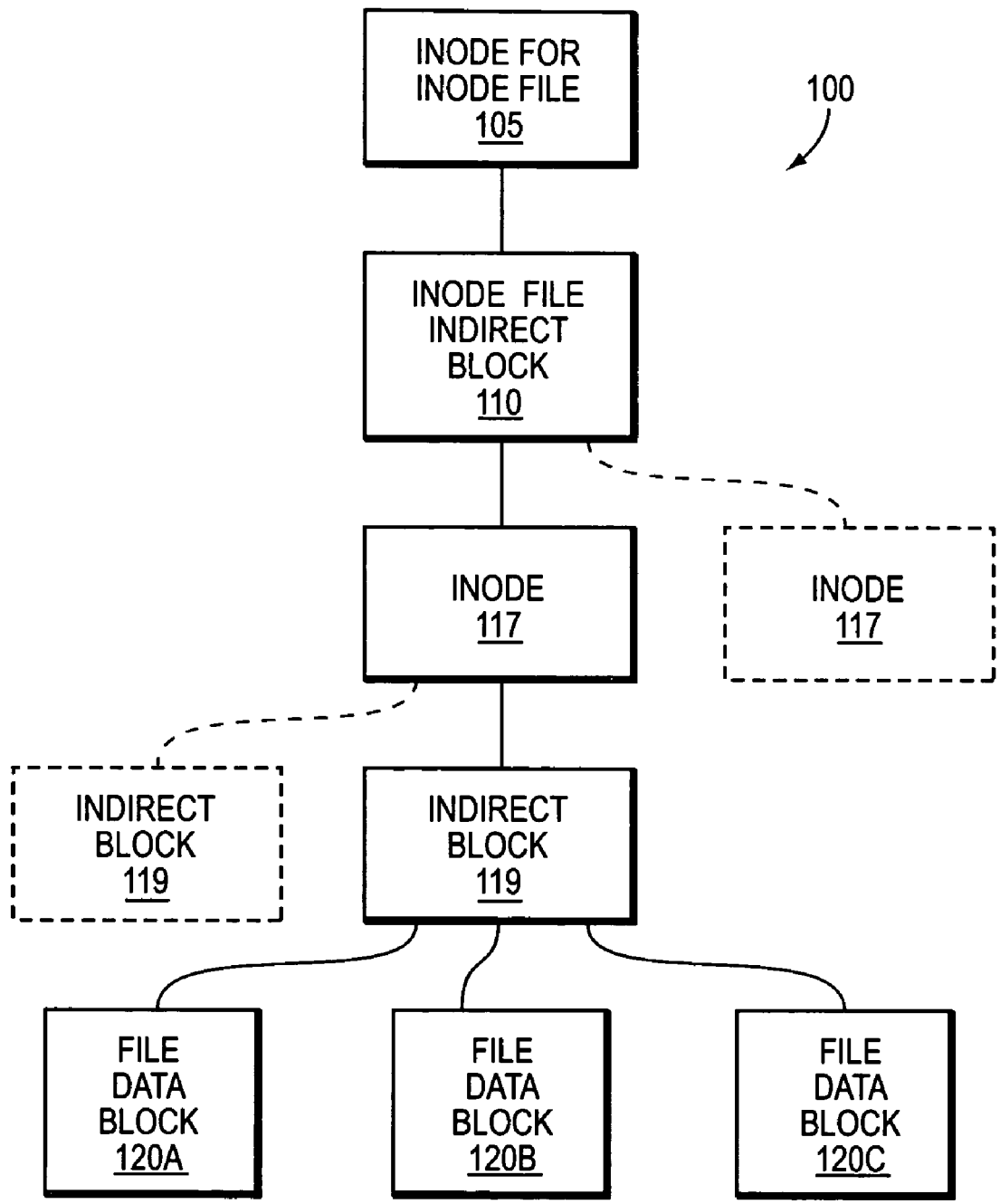
FIG. 1 is a schematic block diagram of an exemplary file system inode structure.
Figure 2:
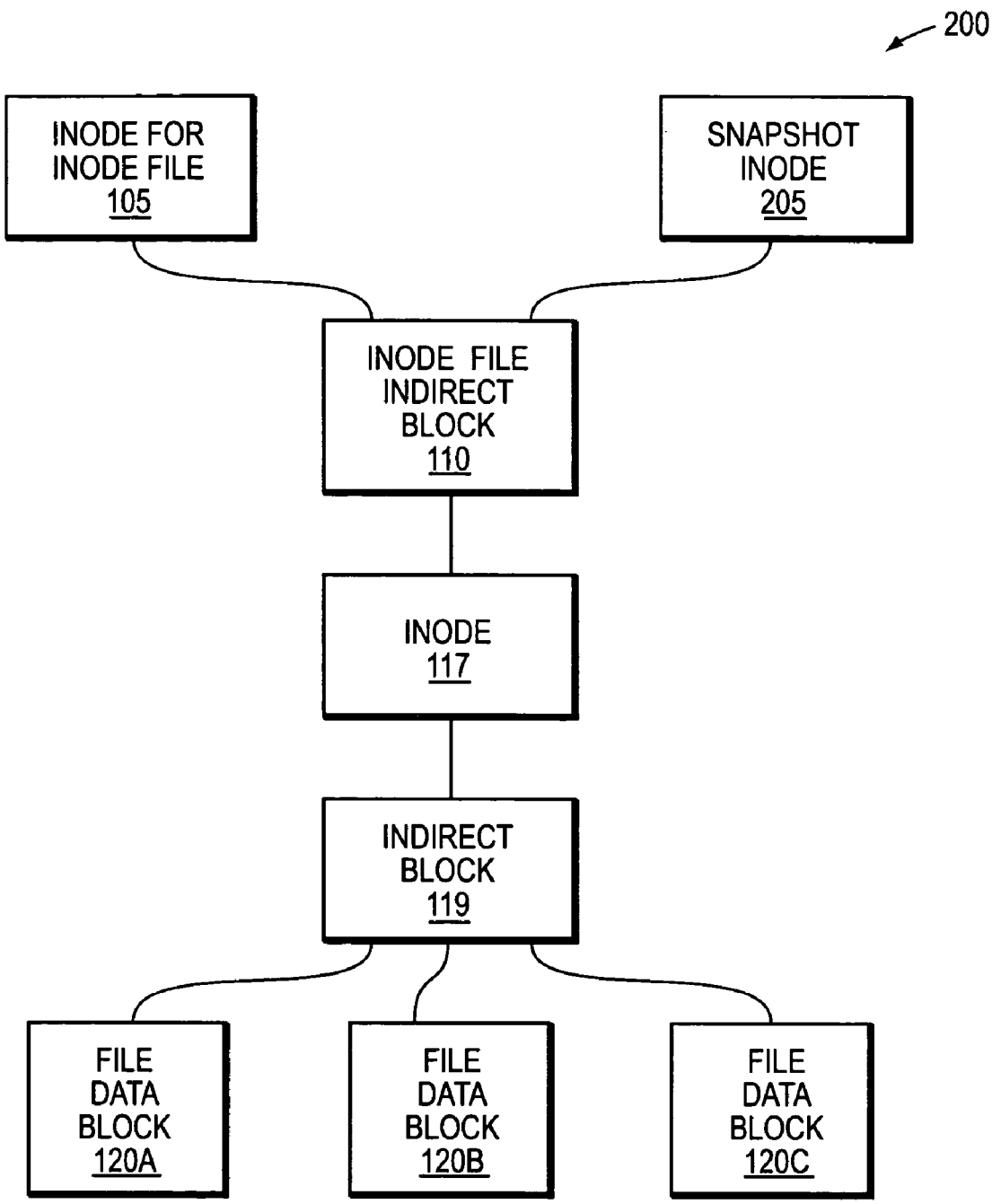
FIG. 2 is a schematic block diagram of the exemplary file system inode structure of FIG. 1 including a snapshot inode.
Figure 3:
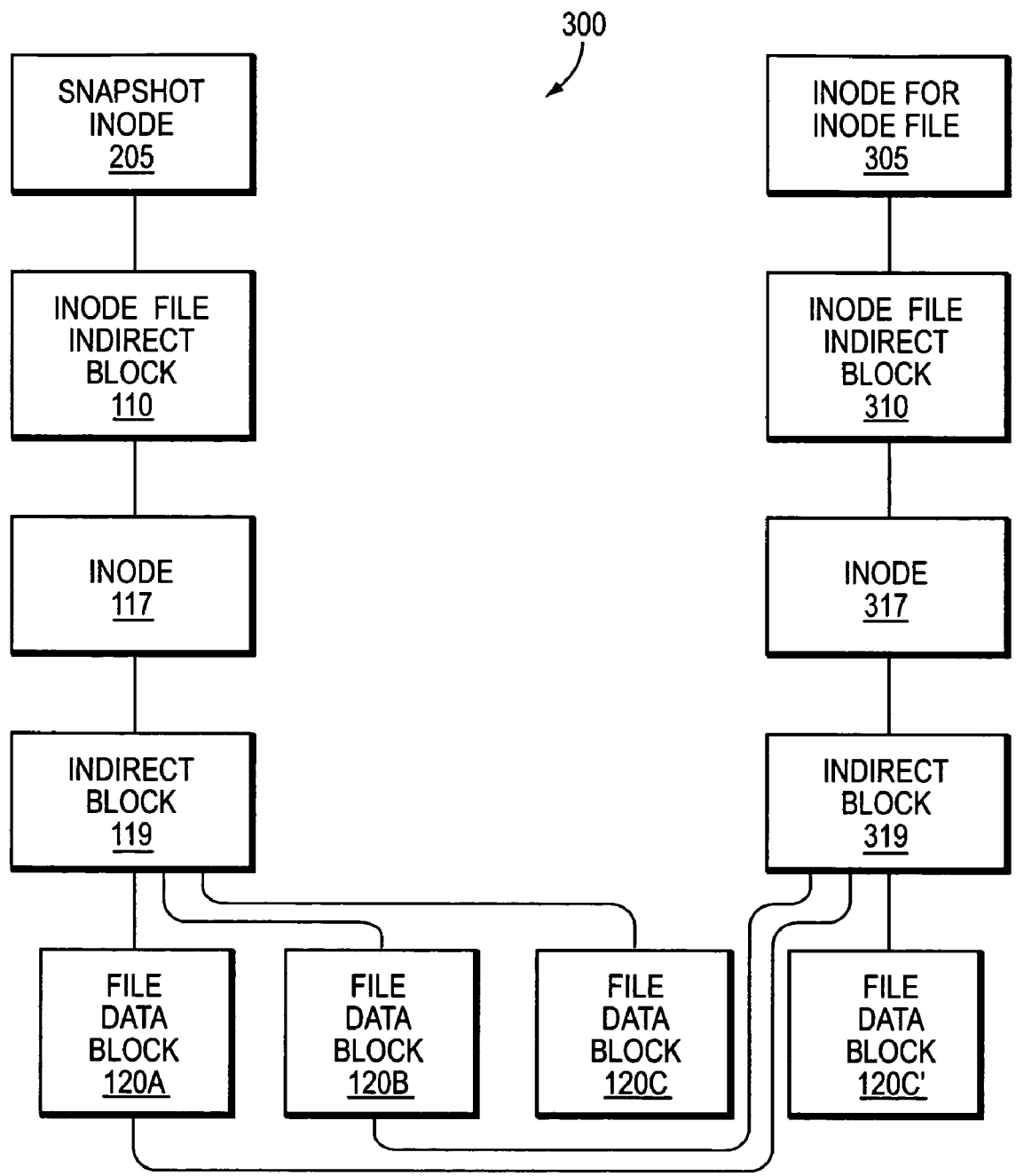
FIG. 3 is a schematic block diagram of an exemplary file system inode structure of FIG. 2 after a data block has been rewritten.
Figure 4:
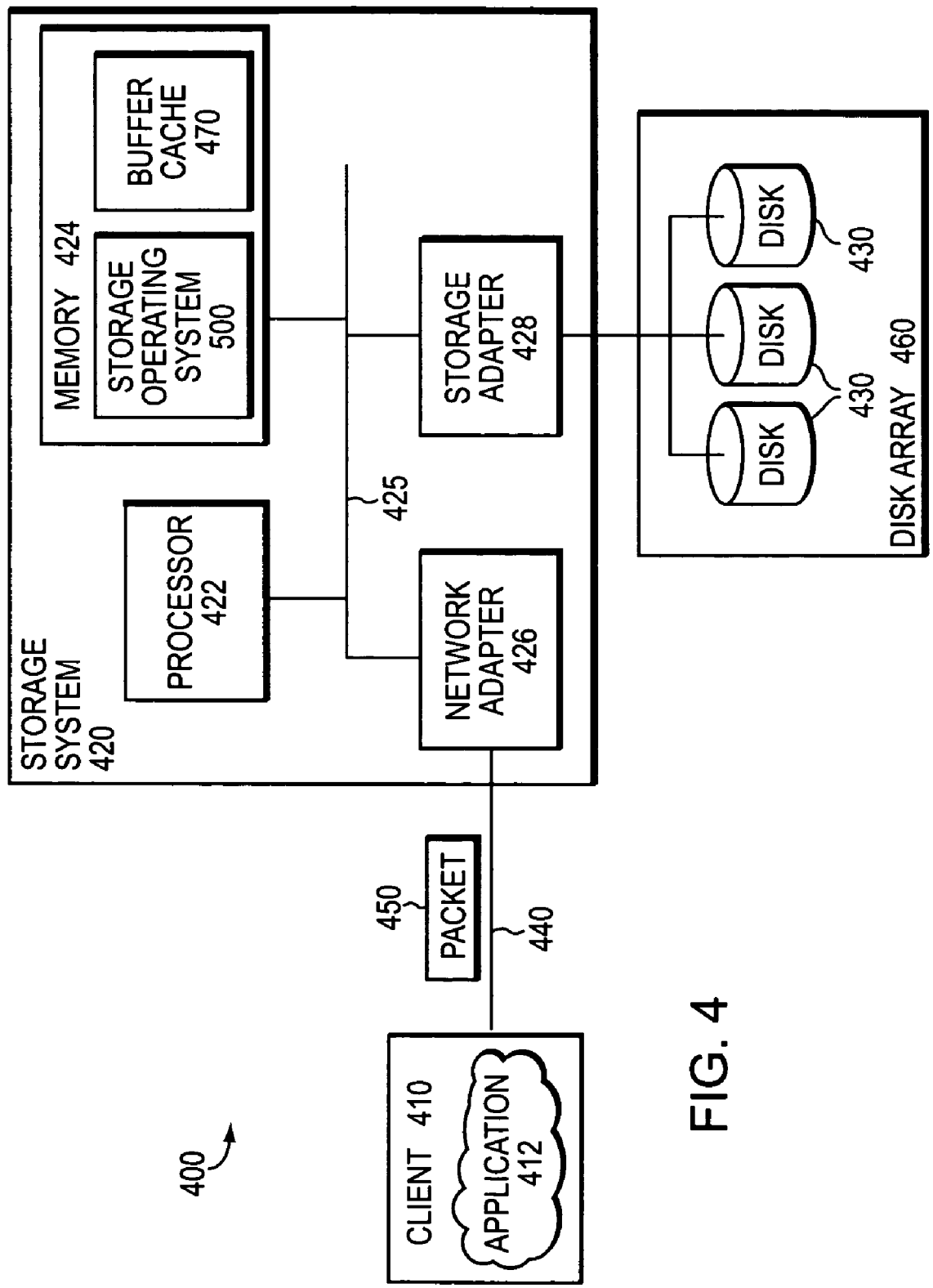
FIG. 4 is a schematic block diagram of an environment including a storage system that may be advantageously used with the present invention.

FIG. 4 is a schematic block diagram of an environment 400 including a storage system 420 that may be advantageously used with the present invention. The storage system is a computer that provides storage service relating to the organization of information on storage devices, such as disks 430 of a disk array 460. The storage system 420 comprises a processor 422, a memory 424, a network adapter 426 and a storage adapter 428 interconnected by a system bus 425. The storage system 420 also includes a storage operating system 500 that preferably implements a high-level module, such as a file system, to logically organize the information as a hierarchical structure of directories, files and special types of files called virtual disks (hereinafter "blocks") on the disks.

In the illustrative embodiment, the memory 424 comprises storage locations that are addressable by the processor and adapters for storing software program code. A portion of the memory may be further organized as a "buffer cache" 470 for storing data structures associated with the present invention. The processor and adapters may, in turn, comprise processing elements and/or logic circuitry configured to execute the software code and manipulate the data structures. Storage operating system 500, portions of which are typically resident in memory and executed by the processing elements, functionally organizes the system 420 by, inter alia, invoking storage operations executed by the storage system. It will be apparent to those skilled in the art that other processing and memory means, including various computer readable media, may be used for storing and executing program instructions pertaining to the inventive technique described herein.

The network adapter 426 comprises the mechanical, electrical and signaling circuitry needed to connect the storage system 420 to a client 410 over a computer network 440, which may comprise a point-to-point connection or a shared medium, such as a local area network. Illustratively, the computer network 440 may be embodied as an Ethernet network or a Fibre Channel (FC) network. The client 410 may communicate with the storage system over network 440 by exchanging discrete frames or packets of data according to pre-defined protocols, such as the Transmission Control Protocol/Internet Protocol (TCP/IP).

The client 410 may be a general-purpose computer configured to execute applications 412. Moreover, the client 410 may interact with the storage system 420 in accordance with a client/server model of information delivery. That is, the client may request the services of the storage system, and the system may return the results of the services requested by the client, by exchanging packets 450 over the network 440. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 428 cooperates with the storage operating system 500 executing on the system 420 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 430, such as HDD and/or DASD, of array 460. The storage adapter includes input/output (I/O) interface circuitry that couples to the disks over an I/O interconnect arrangement, such as a conventional high-performance, FC serial link topology.

Storage of information on array 460 is preferably implemented as one or more storage "volumes" that comprise a collection of physical storage disks 430 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 430, the storage operating system 500 implements a write-anywhere file system that cooperates with virtualization modules to "virtualize" the storage space provided by disks 430. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 5:
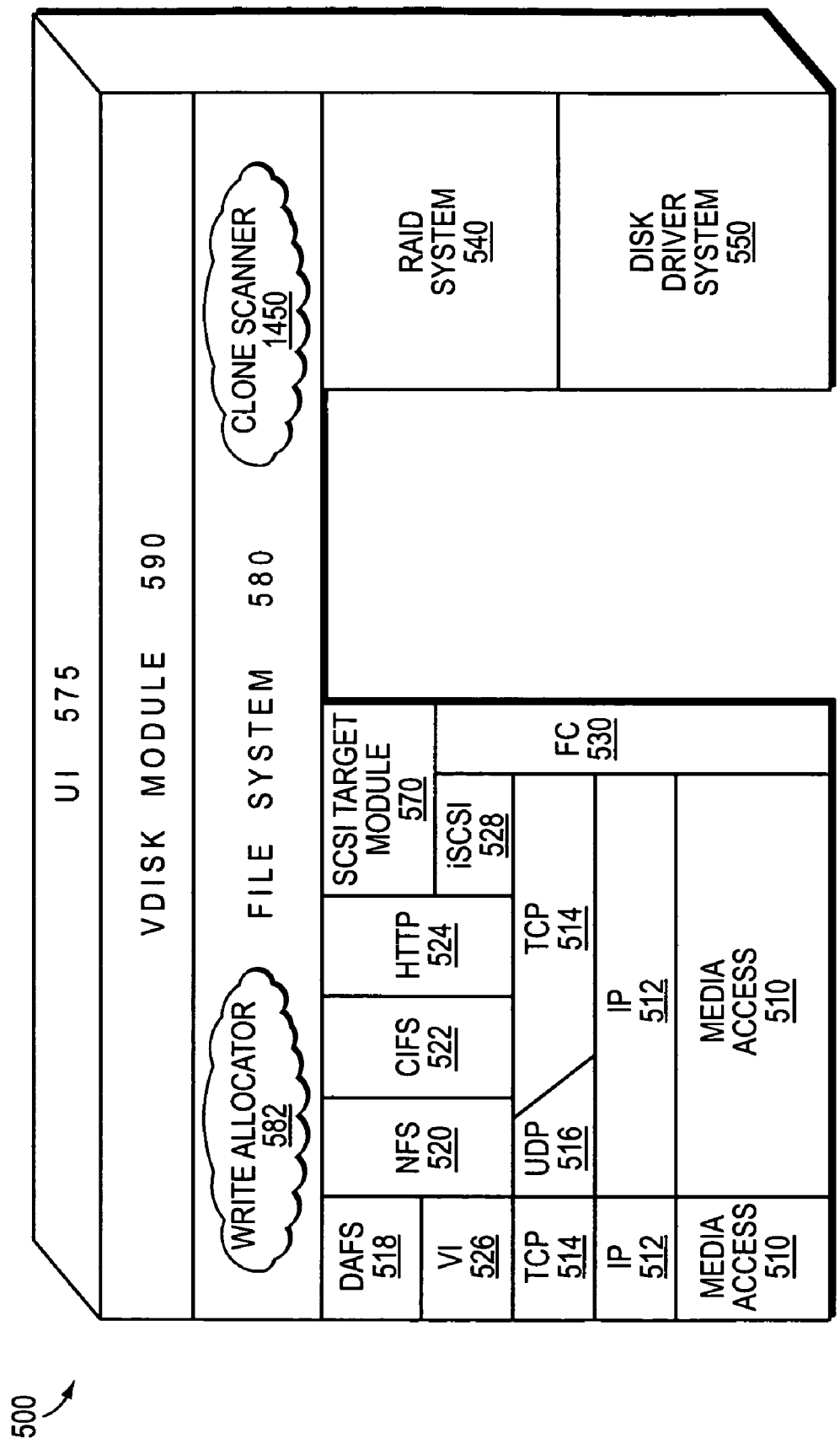
FIG. 5 is a schematic block diagram of a storage operating system that may be advantageously used with the present invention.

FIG. 5 is a schematic block diagram of the storage operating system 500 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 510 of network drivers (e.g., gigabit Ethernet drivers) that interfaces to network protocol layers, such as the IP layer 512 and its supporting transport mechanisms, the TCP layer 514 and the User Datagram Protocol (UDP) layer 516. A file system protocol layer provides multi-protocol file access and, to that end, includes support for the Direct Access File System (DAFS) protocol 518, the NFS protocol 520, the CIFS protocol 522 and the Hypertext Transfer Protocol (HTTP) protocol 524. A VI layer 526 implements the VI architecture to provide direct access transport (DAT) capabilities, such as RDMA, as required by the DAFS protocol 518.

An iSCSI driver layer 528 provides block protocol access over the TCP/IP network protocol layers, while a FC driver layer 530 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 540 that manages the storage and retrieval of information to and from the volumes/disks in accordance with I/O operations, and a disk driver system 550 that implements a disk access protocol such as, e.g., the SCSI protocol.

Bridging the disk software layers with the integrated network protocol stack layers is a virtualization system that is implemented by a file system 580 interacting with virtualization modules illustratively embodied as, e.g., vdisk module 590 and SCSI target module 570. The vdisk module 590 is layered on the file system 580 to enable access by administrative interfaces, such as a user interface (UI) 575, in response to a user (system administrator) issuing commands to the storage system. The SCSI target module 570 is disposed between the FC and iSCSI drivers 528, 530 and the file system 580 to provide a translation layer of the virtualization system between the block (lun) space and the file system space, where luns are represented as blocks. The UI 575 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 580 provides functions normally associated with a volume manager. These functions include (i) aggregation of the disks, (ii) aggregation of storage bandwidth of the disks, and (iii) reliability guarantees, such as mirroring and/or parity (RAID). The file system 580 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the inode file may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 410 is forwarded as a packet 450 over the computer network 440 and onto the storage system 420 where it is received at the network adapter 426. A network driver (of layer 510 or layer 530) processes the packet and, if appropriate, passes it on to a network protocol and file access layer for additional processing prior to forwarding to the write-anywhere file system 580. Here, the file system generates operations to load (retrieve) the requested data from disk 430 if it is not resident "in core", i.e., in the buffer cache 470. If the information is not in the cache, the file system 580 indexes into the inode file using the inode number to access an appropriate entry and retrieve a logical vbn. The file system then passes a message structure including the logical vbn to the RAID system 540; the logical vbn is mapped to a disk identifier and disk block number (disk,dbn) and sent to an appropriate driver (e.g., SCSI) of the disk driver system 550. The disk driver accesses the dbn from the specified disk 430 and loads the requested data block(s) in buffer cache 470 for processing by the storage system. Upon completion of the request, the storage system (and operating system) returns a reply to the client 410 over the network 440.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 420 in response to a request issued by client 410. Moreover, in another alternate embodiment of the invention, the processing elements of adapters 426, 428 may be configured to offload some or all of the packet processing and storage access operations, respectively, from processor 422, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 420. An example of a multi-protocol storage appliance that may be advantageously used with the present invention is described in U.S. patent application Ser. No. 10/215,917 titled, *Multi-Protocol Storage Appliance that provides Integrated Support for File and Block Access Protocols*, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 6:
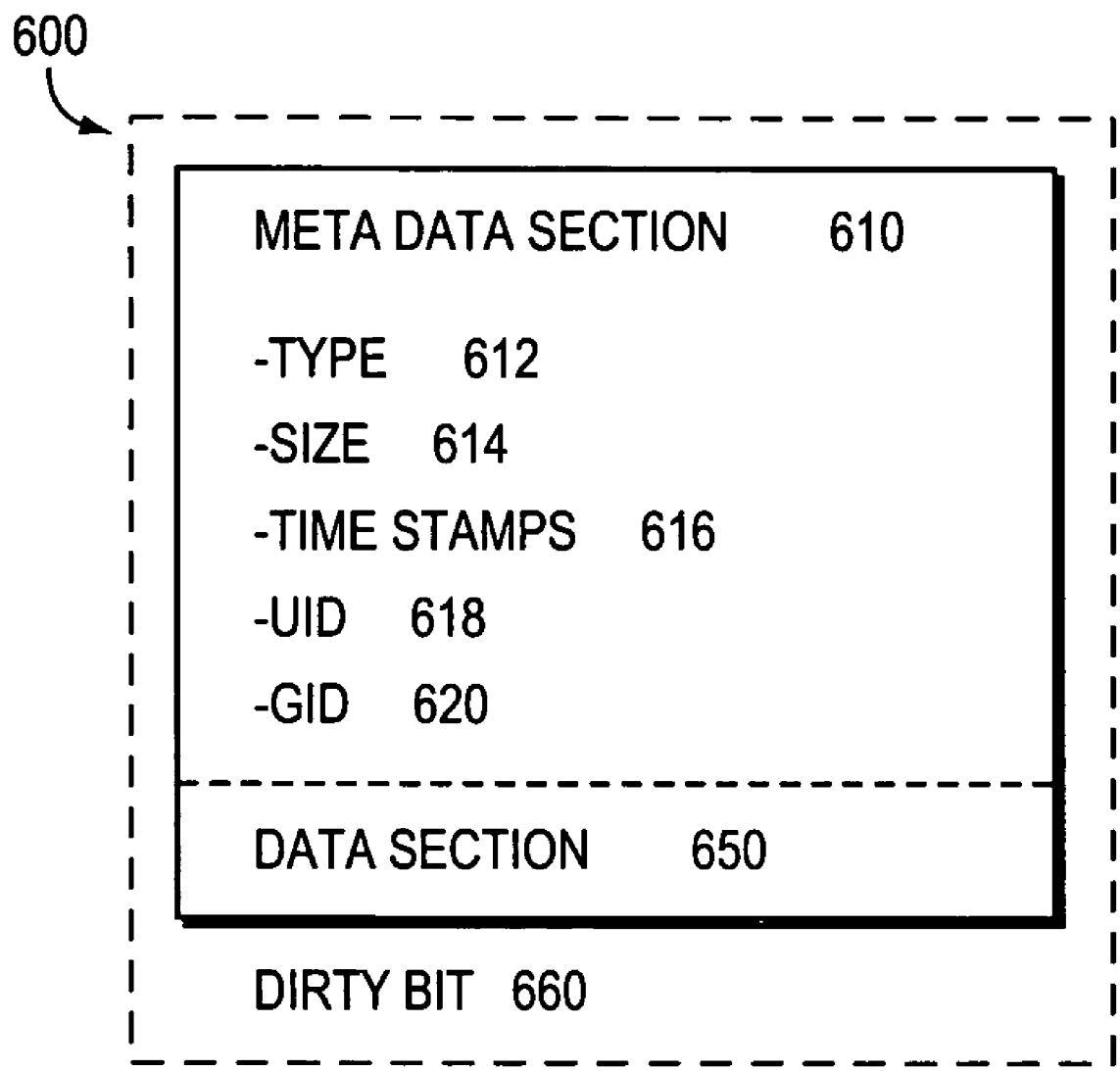
FIG. 6 is a schematic block diagram of an inode that may be advantageously used with the present invention.

In the illustrative embodiment, a file is represented in the write-anywhere file system as an inode data structure adapted for storage on the disks 430. FIG. 6 is a schematic block diagram of an inode 600, which preferably includes a metadata section 610 and a data section 650. The information stored in the metadata section 610 of each inode 600 describes the file and, as such, includes the type (e.g., regular, directory, virtual disk) 612 of file, the size 614 of the file, time stamps (e.g., access and/or modification) 616 for the file and ownership, i.e., user identifier (UID 618) and group ID (GID 620), of the file. The contents of the data section 650 of each inode, however, may be interpreted differently depending upon the type of file (inode) defined within the type field 612. For example, the data section 650 of a directory inode contains metadata controlled by the file is system, whereas the data section of a regular inode contains file system data. In this latter case, the data section 650 includes a representation of the data associated with the file.

Specifically, the data section 650 of a regular on-disk inode may include file system data or pointers, the latter referencing 4 kB data blocks on disk used to store the file system data. Each pointer is preferably a logical vbn to facilitate efficiency among the file system and the RAID system 540 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 650 of the inode (e.g., a second level inode) references an indirect block (e.g., a first level block) that contains 1024 pointers, each of which references a 4 kB data block on disk. For file system data having a size greater than 64 MB, each pointer in the data section 650 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 kB data block on disk. When accessing a file, each block of the file may be loaded from disk 430 into the buffer cache 470.

When an on-disk inode (or block) is loaded from disk 430 into buffer cache 470, its corresponding in core structure embeds the on-disk structure. For example, the dotted line surrounding the inode 600 indicates the in core representation of the on-disk inode structure. The in core structure is a block of memory that stores the on-disk structure plus additional information needed to manage data in the memory (but not on disk). The additional information may include, e.g., a "dirty" bit 660. After data in the inode (or block) is updated/modified as instructed by, e.g., a write operation, the modified data is marked "dirty" using the dirty bit 660 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled *Method for Maintaining Consistent States of a File System and for Creating User-Accessible Read-Only Copies of a File System* by David Hitz et al., issued on Oct. 6, 1998.

Figure 7:
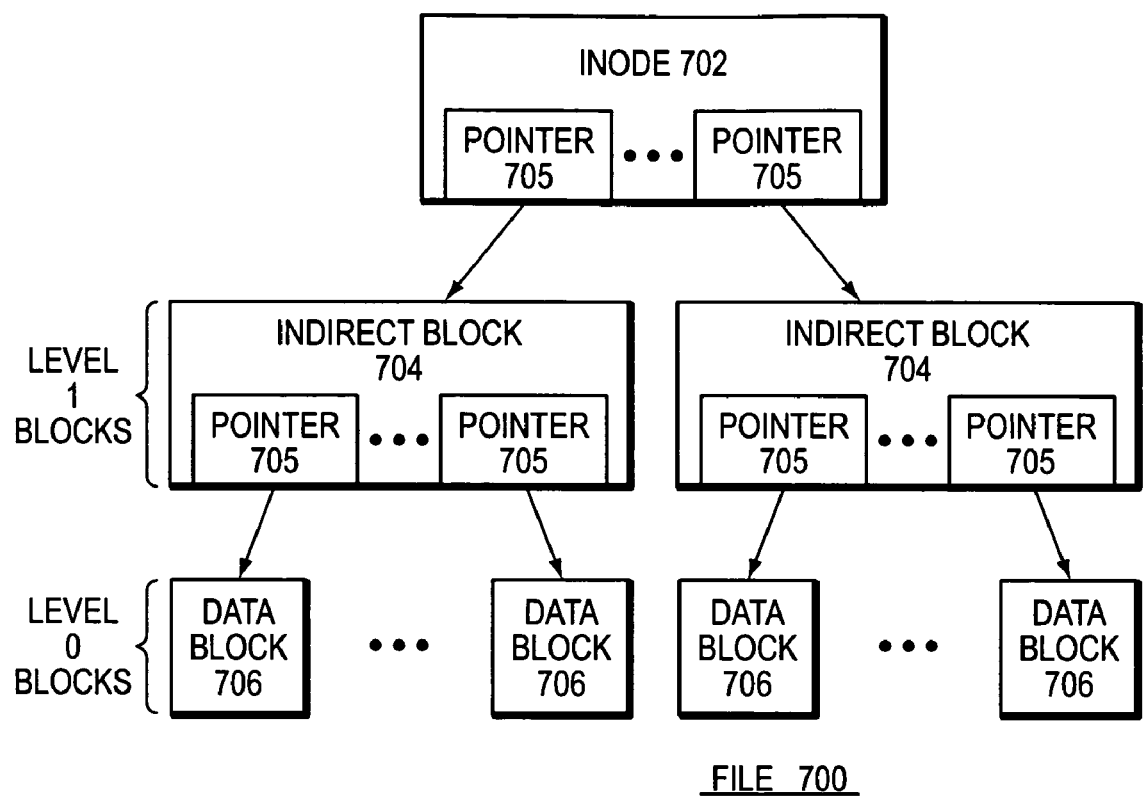
FIG. 7 is a schematic block diagram of a buffer tree of a file that may be advantageously used with the present invention.

FIG. 7 is a schematic block diagram of a buffer tree of a file that may be advantageously used with the present invention. The buffer tree is an internal representation of blocks for a file (e.g., file 700) loaded into the buffer cache 470 and maintained by the write-anywhere file system 580. A root (top-level) inode 702, such as an embedded inode, references indirect (e.g., level 1) blocks 704. The indirect blocks (and inode) contain pointers 705 that ultimately reference data blocks 706 used to store the actual data of file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 430.

The present invention employs a cloning technique that enables efficient and substantially instantaneous creation of a clone that is a copy of a "parent" virtual volume (vvol) in an aggregate of a storage system. The aggregate is a physical volume comprising one or more groups of disks, such as RAID groups, underlying one or more vvols of the storage system. The aggregate has its own physical volume block number (pvbn) space and maintains metadata, such as block allocation bitmap structures, within that pvbn space. The parent vvol may be a typical vvol that, like any vvol, has its own virtual volume block number (wbn) space and maintains metadata, such as block allocation bitmap structures, within that wbn space.

In the illustrative embodiment, pvbns are used as block pointers within buffer trees of files (such as file 700) stored in a vvol. This illustrative "hybrid" vvol embodiment involves the insertion of only the pvbn in the parent indirect block (e.g., inode or indirect block). Use of pvbns avoids latency associated with translations from vvbns-to-pvbns, e.g., when servicing file system (such as NFS, CIFS) requests. On a read path of a logical volume, a "logical" volume (vol) info block has one or more pointers that reference one or more fsinfo blocks, each of which, in turn, "points to" an inode file and its corresponding inode buffer tree. The read path on a vvol is generally the same, following pvbns (instead of vvbns) to find appropriate locations of blocks; in this context, the read path (and corresponding read performance) of a vvol is substantially similar to that of a physical volume. Translation from pvbn-to-disk,dbn occurs at the file system/RAID system boundary of the storage operating system 500.

In an alternate "dual vbn hybrid" vvol embodiment, both the pvbn and wbn are inserted in the parent indirect (e.g., level 1) blocks in the buffer tree of a file, such as file 700. Here, the use of pvbns as block pointers in the indirect blocks provides efficiencies in the read paths, while the use of wbn block pointers provide efficient access to required metadata. That is, when freeing a block of a file, the parent indirect block in the file contains readily available wbn block pointers, which avoids the latency associated with accessing an owner map (described herein) to perform pvbn-to-wbn translations; yet, on the read path, the pvbn is available. A disadvantage of this dual vbn variant is the increased size of indirection data (metadata) stored in each file.

Figure 8:
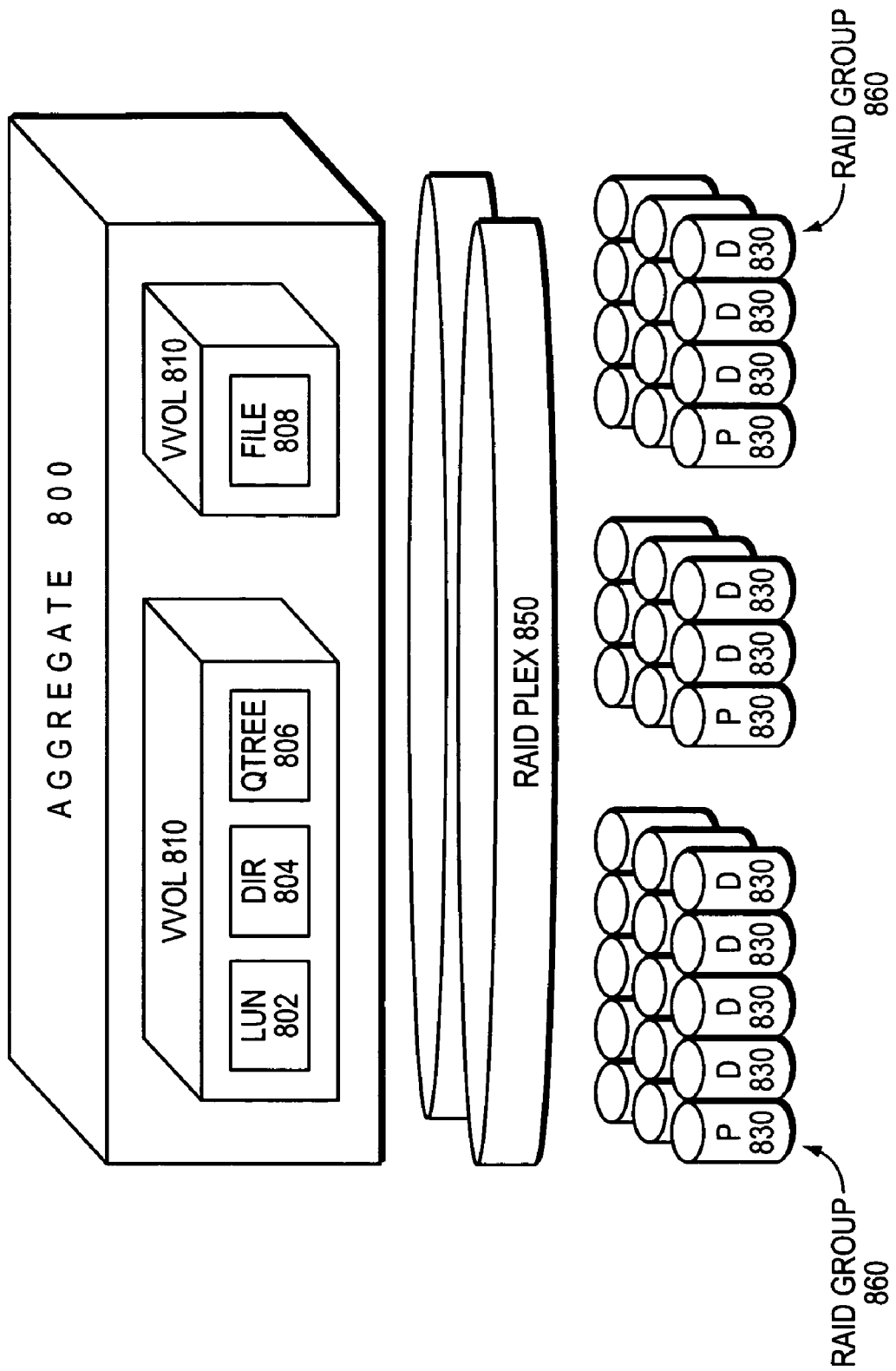
FIG. 8 is a schematic block diagram of an embodiment of an aggregate that may be advantageously used with the present invention.

FIG. 8 is a schematic block diagram of an embodiment of an aggregate 800 that may be advantageously used with the present invention. Luns (blocks) 802, directories 804, qtrees 806 and files 808 may be contained within vvols 810 that, in turn, are contained within the aggregate 800. The aggregate 800 is illustratively layered on top of the RAID system, which is represented by at least one RAID plex 850 (depending upon whether the storage configuration is mirrored), wherein each plex 850 comprises at least one RAID group 860. Each RAID group further comprises a plurality of disks 830, e.g., one or more data (D) disks and at least one (P) parity disk.

Whereas the aggregate 800 is analogous to a physical volume of a conventional storage system, a vvol is analogous to a file within that physical volume. That is, the aggregate 800 may include one or more files, wherein each file contains a vvol 810 and wherein the sum of the storage space consumed by the vvols is physically smaller than (or equal to) the size of the overall physical volume. The aggregate utilizes a "physical" pvbn space that defines a storage space of blocks provided by the disks of the physical volume, while each embedded vvol (within a file) utilizes a "logical" vvbn space to organize those blocks, e.g., as files. Each vvbn space is an independent set of numbers that corresponds to locations within the file, which locations are then translated to dbns on disks. Since the vvol 810 is also a logical volume, it has its own block allocation structures (e.g., active, space and summary maps) in its vvbn space.

Figure 9:
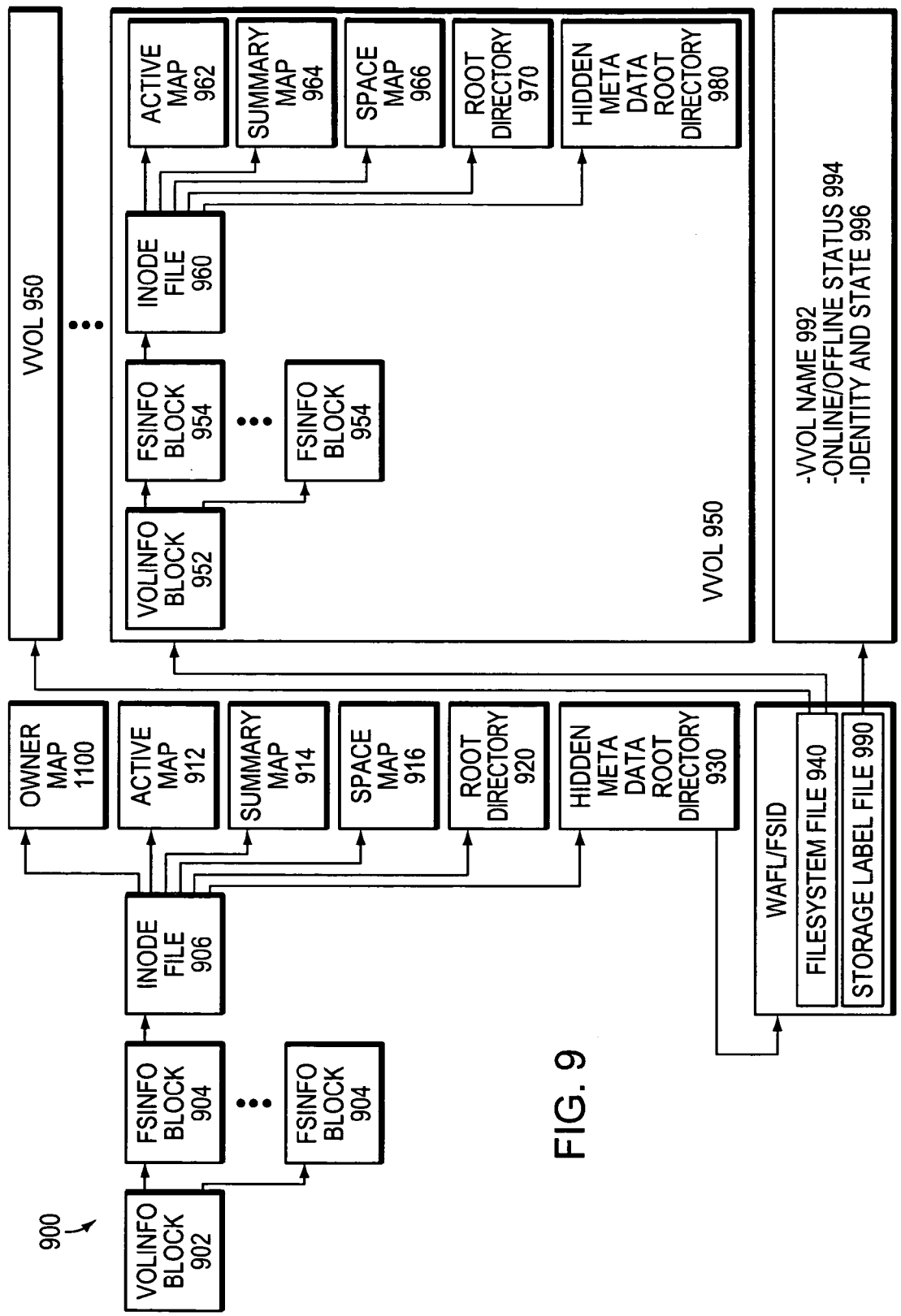
FIG. 9 is a schematic block diagram of an on-disk representation of an aggregate.

FIG. 9 is a schematic block diagram of an on-disk representation of an aggregate 900. The storage operating system 500, e.g., the RAID system 540, assembles a physical volume of pvbns to create the aggregate 900, with pvbns 1 and 2 comprising a "physical" volinfo block 902 for the aggregate. Broadly stated, a volinfo block stores volume-level information, as well as provides support for large numbers of snapshots. To that end, the volinfo block 902 contains block pointers to fsinfo blocks 904, each of which may represent a snapshot of the aggregate. Each fsinfo block 904 includes a block pointer to an inode file 906 that contains inodes of a plurality of files, including an owner map 1100, an active map 912, a summary map 914 and a space map 916, as well as other special metadata files. The inode file 906 further includes a root directory 920 and a "hidden" metadata root directory 930, the latter of which includes a namespace having files related to a vvol in which users cannot "see" the files. The hidden metadata root directory also includes a WAFL/fsid/directory structure, as described herein, which contains a filesystem file 940 and storage label file 990. Note that root directory 920 in the aggregate is empty; all files related to the aggregate are organized within the hidden metadata root directory 930.

The filesystem file 940 includes block pointers that reference various file systems embodied as vvols 950. The aggregate 900 maintains these vvols 950 at special reserved inode numbers. Each vvol 950 also has special reserved inode numbers within its vvol space that are used for, among other things, the block allocation bitmap structures. As noted, the block allocation bitmap structures, e.g., active map 962, summary map 964 and space map 966, are located in each vvol.

Specifically, each vvol 950 has the same inode file structure/content as the aggregate, with the exception that there is no owner map and no WAFL/fsid/filesystem file, storage label file directory structure in a hidden metadata root directory 980. To that end, each vvol 950 has a volinfo block 952 that points to one or more fsinfo blocks 954, each of which may represent a snapshot of the vvol. Each fsinfo block, in turn, points to an inode file 960 that, as noted, has the same inode structure/content as the aggregate with the exceptions noted above. Each vvol 950 has its own inode file 960 and distinct inode space with corresponding inode numbers, as well as its own root (fsid) directory 970 and subdirectories of files that can be exported separately from other vvols.

The storage label file 990 contained within the hidden metadata root directory 930 of the aggregate is a small file that functions as an analog to a conventional raid label. A raid label includes "physical" information about the storage system, such as the volume name; that information is loaded into the storage label file 990. Illustratively, the storage label file 990 includes the name 992 of the associated vvol 950, the online/offline status 994 of the vvol, and other identity and state information 996 of the associated vvol (whether it is in the process of being created or destroyed).

A container file is a file in the aggregate that contains all blocks used by a vvol. The container file is an internal (to the aggregate) feature that supports a vvol; illustratively, there is one container file per vvol. The container file is a hidden file (not accessible to a user) in the aggregate that holds every block in use by the vvol. As noted, the aggregate includes an illustrative hidden metadata root directory that contains subdirectories of vvols:

WAFL/fsid/filesystem file, storage label file

Specifically, a "physical" file system (WAFL) directory includes a subdirectory for each vvol in the aggregate, with the name of subdirectory being a file system identifier (fsid) of the vvol. Each fsid subdirectory (vvol) has at least two files, the filesystem file 940 and the storage label file 990.

Figure 10:
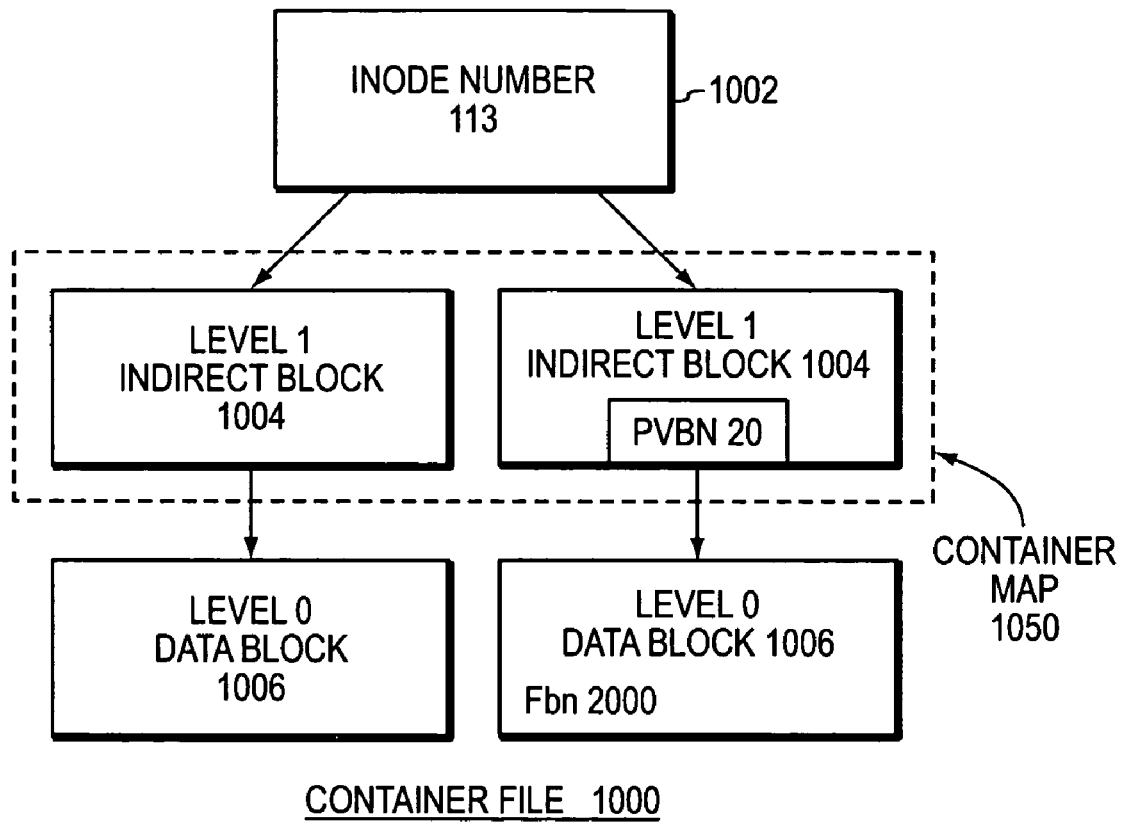
FIG. 10 is a schematic block diagram of a container file that may be advantageously used with the present invention.

The filesystem file is a large sparse file that contains all blocks owned by a vvol and, as such, is referred to as the container file for the vvol. FIG. 10 is a schematic block diagram of a container file 1000 (buffer tree) that is assigned a new type and has an inode 1002 that is assigned an inode number equal to a virtual volume id (vvid) of the vvol, e.g., container file 1000 has an inode number 113. The container file is essentially one large virtual disk and, since it contains all blocks owned by its vvol, a block with wbn X in the vvol can be found at fbn X in the container file. For example, wbn 2000 in a vvol can be found at fbn 2000 in its container file 1000. Since each vvol has its own distinct wbn space, another container file may have fbn 2000 that is different from fbn 2000 in the illustrative container file 1000.

Assume that a level 0 block 1006 of the container file 1000 has an fbn 2000 and an indirect (level 1) block 1004 of the level 0 block 1006 has a block pointer referencing the level 0 block, wherein the block pointer has a pvbn 20. Thus, location fbn 2000 of the container file 1000 is pvbn 20 (on disk). Notably, the block numbers are maintained at the first indirect level (level 1) of the container file 1000; e.g., to locate block 2000 in the container file, the file system layer accesses the $2000^{th}$ entry at level 1 of the container file and that indirect block provides the pvbn 20 for fbn 2000.

In other words, level 1 indirect blocks of the container file contain the pvbns for blocks in the file and, thus, "map" vvbns-to-pvbns of the aggregate. Accordingly, the level 1 indirect blocks of the container file 1000 are configured as a "container map" 1050 for the vvol; there is preferably one container map 1050 per vvol. The container map provides block pointers from fbn locations within the container file to pvbn locations on disk. Furthermore, there is a one-to-one correspondence between fbn locations in the container file and vvbn locations in a vvol.

Figure 11:
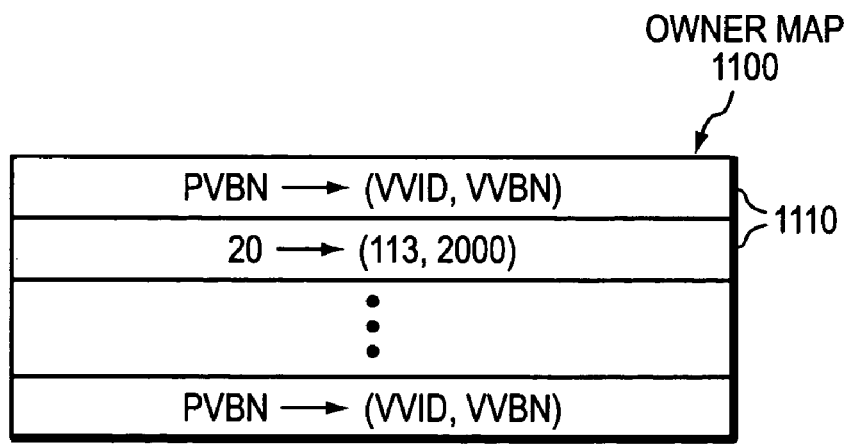
FIG. 11 is a schematic block diagram of an owner map that may be advantageously used with the present invention.

While the container map 1050 provides a "forward" mapping of vvbn-to-pvbn, an owner map provides a "backward" mapping between pvbn-to-vvbn (and vvid). In particular, mapping metadata of the owner map provides a backward mapping between each pvbn in the aggregate to (i) a vvid that "owns" the pvbn and (ii) the vvbn of the vvol in which the pvbn is located. FIG. 11 is a schematic block diagram of an owner map 1100 that may be advantageously used with the present invention. The owner map 1100 may be embodied as a data structure having a plurality of entries 1110; there is preferably one entry 1110 for each block in the aggregate.

In the illustrative embodiment, each entry 1110 has a 4-byte vvid and a 4-byte vvbn, and is indexed by a pvbn. That is, for a given block in the aggregate, the owner entry 1110 indicates which vvol owns the block and which pvbn it maps to in the vvbn space, e.g., owner entry 1110 indexed at pvbn 20 has contents vvid 113 and vvbn 2000. Thus when indexing into the owner map 1100 at pvbn 20, the file system 580 accesses a vvol having an inode 113 (which is container file 1000) and then accesses block location 2000 within that file. Each entry 1110 of the owner map 1100 is only valid for blocks that are in use and a vvol only owns those blocks used in the contained file system.

Figure 12:
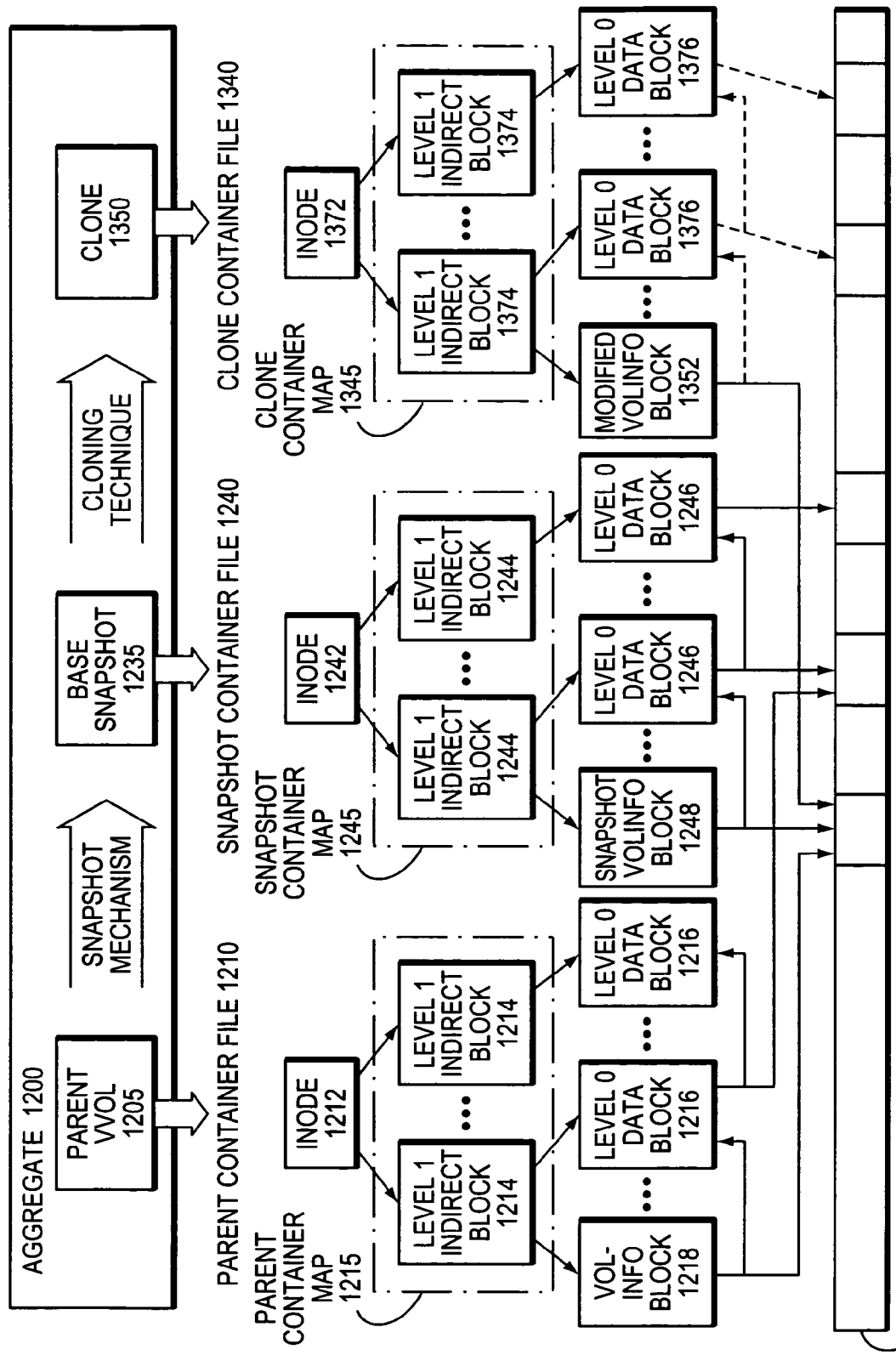
FIG. 12 is a schematic block diagram illustrating an embodiment of an aggregate including a clone that may be advantageously used with the present invention.

FIG. 12 is a schematic block diagram illustrating an embodiment of an aggregate 1200 that may be advantageously used with the present invention. The aggregate 1200 contains at least one vvol, hereinafter parent vvol 1205. The parent vvol 1205 comprises a parent container file 1210 (similar to container file 1000) that is represented as a parent buffer tree having a plurality of blocks in the aggregate, including inode 1212, level 1 indirect blocks 1214, which are organized as parent container map 1215 (similar to container map 1050), and level 0 data blocks 1216, which comprise all of the blocks used by the parent vvol 1205, including a volinfo block 1218. Each block includes one or more pointers that reference (point to) physical blocks located on disk 1220. In the illustrative hybrid vvol embodiment, the pointers within the vvol are aggregate block numbers, such as pvbns.

As noted, a vvol (such as parent vvol 1205) generally has the same inode file structure/content as the aggregate, including its own inode file and distinct inode space with corresponding inode numbers, as well as its own root (fsid) directory and subdirectories of files (inodes). To that end, the parent vvol 1205 has a volinfo block 1218 that points to one or more fsinfo blocks that, in turn, points to an inode of an inode file that has the same inode structure/content as the aggregate with the exceptions previously noted. The inode for the inode file contains information describing the inode file associated with a file system, such as file system 580, executing on the parent vvol 1205. The inode for the inode file may contain a pointer that references (points to) an inode file indirect block containing a set of pointers that reference inodes within its root directory. Each inode contains pointers to indirect blocks, such as level 1 indirect blocks and each indirect block includes pointers to level 0 data blocks.

A snapshot can be created from the parent vvol 1205 in accordance with a conventional snapshot mechanism. When the file system 580 generates a parent vvol snapshot (hereinafter "base snapshot" 1235) of its active file system, an image of the active file system at a point in time (i.e., a consistently point, CP) is "frozen". Note that the base snapshot 1235 is contained within and uses blocks in the parent container file 1210. As a result, there is no container file for the base snapshot 1235 as the snapshot reuses shared blocks in the vvbn space (and pvbn space) with the parent's active file system. However, for purposes of depiction and ease of description, a "snapshot container file 1240" is shown and described with respect to FIG. 12. Yet is should be noted that blocks in the parent container file 1210 are "held down" by the base snapshot 1235 and the clone (described herein) shares the same pvbns. Moreover, the clone uses blocks in the vvbn space for which it has no pointers in its container; this is what keeps the clone from freeing the parent's blocks.

As illustratively shown, the base snapshot 1235 comprises a snapshot container file 1240 (similar to parent container file 1210) that is represented as a snapshot buffer tree having a plurality of blocks in the aggregate, including inode 1242, level 1 indirect blocks 1244, which are organized as snapshot container map 1245 (similar to parent container map 1215), and level 0 data blocks 1246, which comprise all of the blocks used by the base snapshot 1235, including a snapshot volinfo block 1248. The snapshot volinfo block 1248 is a duplicate copy of the volinfo block 1218 of the parent vvol 1205. Accordingly, the base snapshot 1235 shares data structures, such as fsinfo blocks, as well as inodes, indirect blocks and data blocks of an inode buffer tree, with the active file system on parent vvol 1205. An instance of the parent vvol "file" in the active file system thus cannot be deleted if the instance of the same file in the snapshot is to be preserved.

In particular, the snapshot mechanism ensures that all blocks of the inode buffer tree remain fixed and all pointers within that buffer tree reference (point to) those fixed blocks. To that end, the physical blocks (pvbns) in the aggregate that are used by the base snapshot 1235 remain fixed and cannot be changed as long as the snapshot persists. In general, when a snapshot is created, all blocks that existed at the CP are prevented from being deleted and/or overwritten in accordance with a snapshot pinning mechanism and any new changes to the blocks in the buffer tree are written elsewhere (to other free blocks). In the case of the base snapshot 1235, those changes are written to blocks in a wbn space and in a pvbn space of the aggregate. Although the snapshotted blocks remain intact, any additional changes to the active file system are written in free blocks of the wbn and pvbn spaces.

With respect to the snapshot pinning mechanism, each snapshot has an associated in-memory "pin counter" variable. Each volume has an in-memory data structure that includes an array containing information about the current snapshots for that volume (one array element per snapshot). Part of each array is the pin counter having a value that is dynamically adjusted and initialized at system boot. Pinning increases the counter by 1 and unpinning decreases the counter by 1. When the value of the pin counter is non-zero, the associated snapshot is regarded as "pinned" (locked) and cannot be deleted.

The cloning technique is employed to create a new vvol (e.g., filesystem file), along with a new fsid subdirectory in the aggregate and a new storage label file. The new vvol is embodied as a clone 1350 and comprises an appropriately sized clone container file 1340 represented as a clone buffer tree having a plurality of blocks in the aggregate, including inode 1372, level 1 indirect blocks 1374, which are organized as a clone container map 1345 and level 0 data blocks 1376, which comprise all of the blocks used by the clone. Initially the clone container file 1340 has no (zero) data, i.e., it is entirely sparse, and the container map 1345 is empty. Moreover, a volinfo block for the clone is created that is a slightly modified version of the volinfo block 1248 from the base snapshot 1235. The modified volinfo block 1352 is written to (store at a level 0 data block of) the container file 1340 of the new vvol clone, i.e., the clone is inserted at the volinfo block location of the new vvol.

It should be noted that the clone container file 1340 only holds all blocks allocated to the clone 1350. The point of a clone is that is uses blocks "owned" by the parent vvol 1205. The clone container file 1340 has "holes" at the locations of any blocks inherited from the parent vvol. As an example, assume that an indirect block pointer in a file in the parent vvol 1205 contains pvbn 100 and vvbn 200. Thus, block 200 in the parent container file 1210 is pvbn 100. In clone 1350, the indirect block pointers are also pvbn 100 and vvbn 200, but entry 200 in the clone container file 1340 is zero ("0"), indicating a hole and that the clone inherited its wbn 200 from the parent vvol. Since entry 200 is 0, the clone "knows" that it could not free the block 100.

Figure 13:
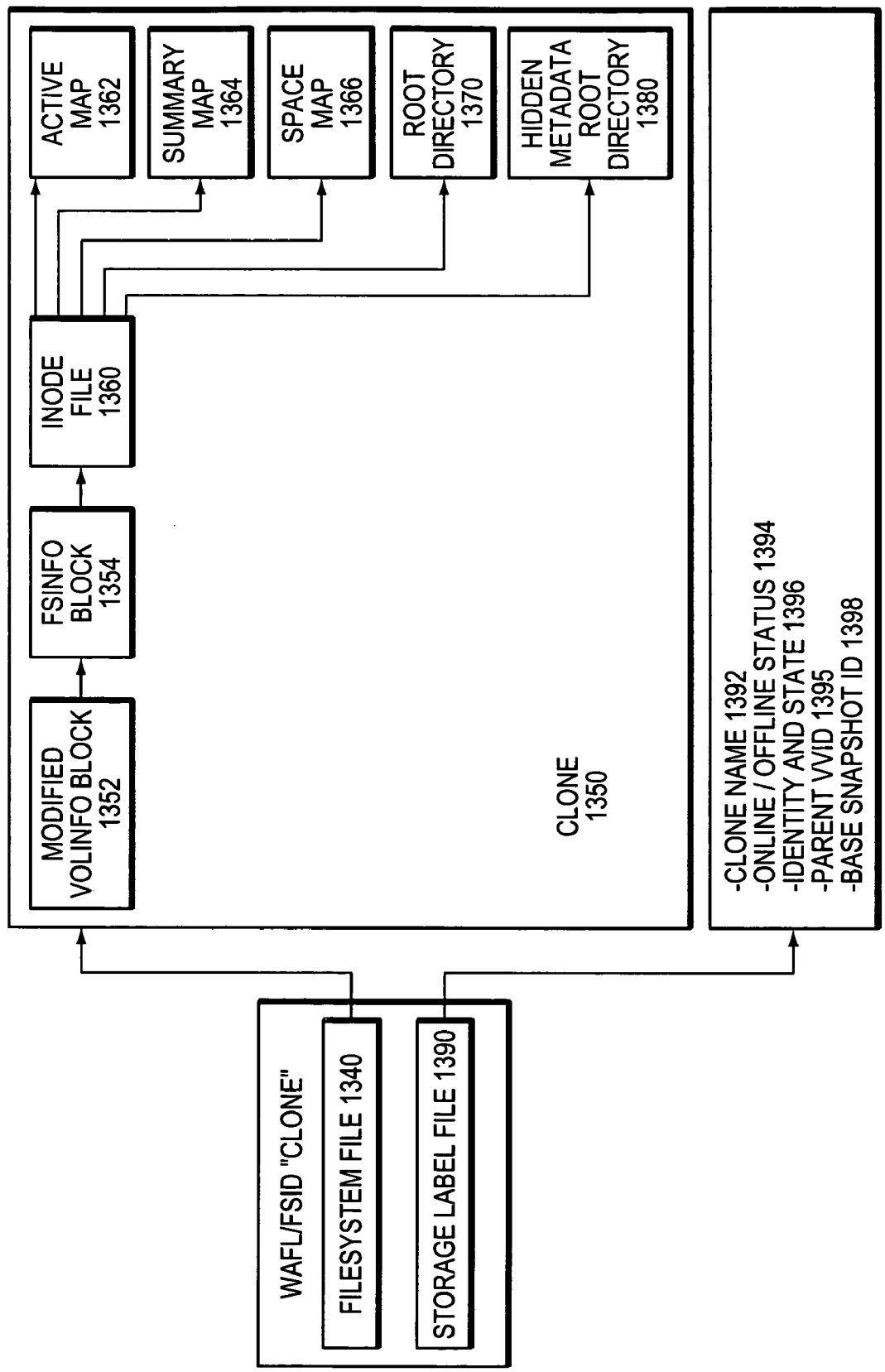
FIG. 13 is a schematic block diagram of an on-disk representation of the clone of FIG. 12.

FIG. 13 is a schematic block diagram of an on-disk representation of clone 1350. The hidden metadata root directory 930 (FIG. 9) in the aggregate 900 is modified to include a new fsid "clone" subdirectory having at least two new files, filesystem file 1340 and storage label file 1390: WAFL/fsid "clone"/filesystem file, storage label file. As noted, the storage label file is a small file that functions as an analog to a conventional raid label and, to that end, the new storage label file 1390 includes the name 1392 of the clone 1350, the online/offline status 1394 of the clone, and other identity and state information 1396 of the associated clone 1350.

Similarly, the new filesystem file 1340 is a large sparse file that contains all blocks owned by a vvol (clone) and, as such, is also referred to as the container file for the clone. The new filesystem file 1340 includes a block pointer that references a file system embodied as clone 1350. As a vvol, the clone 1350 has a vvol space with special reserved inode numbers that are used for, among other things, the block allocation bitmap structures. As further described herein, the block allocation bitmap structures, e.g., active map 1362, summary map 1364 and space map 1366, are inherited from the base snapshot 1235 (and thus the parent vvol 1205).

Specifically, the clone 1350 includes a volinfo block 1352 that points to a fsinfo block that, in turn, points to an inode of inode file that has the same inode structure/content as the aggregate with the exceptions previously noted. The inode for the inode file contains information describing the inode file 1360 associated with the file system, such as file system 580, executing on the clone 1350. The inode for the inode file may contain a pointer that references (points to) an inode file indirect block containing a set of pointers that reference inodes within root directory 1370 of the clone 1350. Each inode contains pointers to indirect blocks, such as level 1 indirect blocks and each indirect block includes pointers to level 0 data blocks.

Referring also to FIG. 12, the snapshot volinfo block 1248 from the base snapshot 1235 is inserted as a level 0 data block (volinfo block 1352) within the container file 1340 on the clone. The volinfo block 1352 is a slightly modified version of the snapshot volinfo block 1248; for example, the volinfo block 1352 is modified to delete all snapshots (fsinfo blocks) other than fsinfo block 1354 for the base snapshot 1235. The inherited summary map 1364 is also modified to reflect that all non-cloned snapshots have been removed (deleted) from the clone. The modified volinfo block 1352 is thus substantially similar to snapshot volinfo block 1248 and, to that end, essentially incorporates the base snapshot into the clone; accordingly the base snapshot (and its associated safeguards) protects the snapshotted blocks from being overwritten. All new changes are written to block locations in the wbn and pvbn spaces of the base snapshot (parent vvol 1205) that are not used and, thus, cannot interfere with the clone.

Since the modified volinfo block 1352 forms the root of a modified volinfo buffer tree that is similar to a parent volinfo block buffer tree of the parent vvol 1205, all blocks of the parent volinfo block buffer tree can be accessed when traversing the modified volinfo block buffer tree. In other words, the snapshot volinfo block 1248 stored in a level 0 block of the snapshot container file 1240 (actually the parent container file 1210) contains pointers that reference other blocks of its buffer tree stored in other level 0 blocks 1246 (1216) of the container file 1240 (1210). The pointers within the volinfo block 1248 to the other level 0 blocks 1246 are physical pointers (pvbns) that reference physical block locations on disk 1220. Those parent (snapshot) volinfo buffer tree blocks can be accessed through the modified volinfo block 1352 of the clone 1350 in the same manner as traversing the snapshot container file tree 1240 because the blocks within the modified volinfo block buffer tree are the physical blocks represented by the level 0 data blocks 1246 in the snapshot container file 1240. (As noted, these blocks are actually in the parent container file 1210.) Ultimately, the snapshot volinfo block 1248 and the modified volinfo block 1352 reference the same physical block locations on disk 1220.

The clone 1350 may then be instantiated by, e.g., loading a file system associated with the new vvol onto the clone and bringing the clone "online", with the only blocks owned by the clone comprising its modified volinfo block. The file system, such as file system 580, executes on the clone as it would on a typical vvol, such as the parent vvol. In fact, the file system within the clone resembles the file system within the base snapshot, since they comprise substantially the same blocks on disk. The resulting clone 1350 is thus a "full-fledged" vvol, i.e., it can service storage (read and write) requests and has its own logical properties, such as snapshot operation functionality, that enables the clone to be snapshotted, snap restored, snapmirrored and otherwise manipulated as any other vvol. A restriction is that the base snapshot 1235 cannot be deleted in the parent vvol 1205 while the clone exists. As a result, the cloning technique enables the clone and parent vvol to share on-disk blocks of data in a zero-copy fashion, similar to a conventional snapshot, while also allowing for modifications (unlike the conventional snapshot).

Notably, a fundamental property of the cloning technique is that the base snapshot 1235 is common among the clone 1350 and its parent vvol 1205 and, thus, cannot be deleted or freed in the parent vvol while the clone exists. That is, all blocks shared between the clone and its parent vvol are blocks within that base snapshot and, thus, neither may attempt to free or delete those blocks. This restriction also precludes any operation that implicitly makes the snapshot disappear. However, the restriction may be relaxed to allow the clone to "free" the snapshot; freeing of the snapshot requires checking of the owner map 1100 by block free operations on the clone to determine whether the clone or parent owns the block in the aggregate. The clone may only return a block to the aggregate if it owned the block, not if it was inherited from the parent. However in the dual vbn embodiment, reference is made directly to the clone container file 1340 to determine the owner of the block.

Special care is thus taken to prevent the base snapshot 1235 from being freed or deleted. According to the cloning technique, when the clone is created, a parent vvid 1395 and base snapshot identifier (ID) 1398 are inserted into the storage label file 1390 associated with the clone 1350. The parent vvid 1395 is illustratively the inode number of the parent container file 1210, while the base snapshot ID 1398 is manifested as a bitmap of snapshot identifiers (an array of bits), one for each possible snapshot. The bitmap is provided because it is possible and sometimes advantageous to inherit multiple snapshots from a parent vvol. In this case, the mechanism described herein is generally the same, while leaving pointers to both parent base snapshots (when slightly modifying the volinfo block). In addition, multiple clones 1350 may be spawned from the same base snapshot 1235; in this case, information is recorded by setting the same snapshot bit in bit fields in both clone's storage label files 1390. In general, the file system 580 preserves a snapshot by recording in the storage label file 990 (FIG. 9) of each vvol 950 whether that file is a clone and, if it is a clone, which vvol is its parent and which snapshot(s) it has inherited.

When mounting an aggregate, such as aggregate 900, a table (not shown) is constructed having entries for all clones in the aggregate. When coming online and before mounting any vvols, the aggregate examines all storage label files 990 of all vvols 950 to determine relationships among the vvols, e.g., whether the vvols are parents or clones. A responsibility of the aggregate is to enforce these relationships and prevent the parent vvols from destroying any base snapshot that forms the basis of a clone. As the vvols 950 come online, the table can be used to "pin" (mark as undeletable) base snapshots of vvols that need to be preserved for clones (in accordance with the snapshot pinning mechanism), while also preventing any sort of destructive operation that may delete those snapshots.

Since the modified volinfo block 1352 references physical block locations in the aggregate that cannot be deleted (because they are held down by the base snapshot 1235 in the parent vvol 1205), when the clone 1350 comes online, it functions in a manner similar to that of a snap restore arrangement. That is, the modified volinfo block 1352 of the clone references a snapshot at a particular point in time (the base snapshot 1235) and the clone restores the state of the active file system as represented by that snapshot. The difference between a clone and a conventional snapshot is that write allocation can be performed on the clone that essentially allows changes to the base snapshot.

When changes are made to the clone (i.e., blocks of the base snapshot 1235), those changes are written out (stored) according to an extended write allocation technique employed by the file system. The extended write allocation technique is described in U.S. patent application Ser. No. 10/836,090 titled, Extension of Write Anywhere File Layout Write Allocation, filed <date>. Broadly stated, a write allocator 582 (FIG. 5) selects a pvbn in the aggregate for a newly allocated block and selects a vvbn in the clone for that new block using appropriate block allocation bitmaps for both the pvbn and vvbn spaces. As noted, the container file 1340 on the clone 1350 initially has no data other than the modified volinfo block 1352. As write operations occur into the clone, the file system 580 fills in the level 0 blocks 1376 of the container file 1340 with the changes associated with those write operations.

As further noted, the block allocation bitmaps used by the file system to select the wbn are inherited from the base snapshot. By inheriting the base snapshot's bitmaps, the file system executing on the clone also inherits the snapshot's wbn space; any changes made to the clone are thus directed to "empty" or unused blocks in that inherited wbn space. This avoids any collisions with the blocks in the base snapshot 1235. However, the inherited vvbn space diverges from the wbn space of the base snapshot at the time the clone is created. Therefore, as changes are made to the clone, the container file 1340 on the clone starts filling in its level 0 blocks in accordance with the extended write allocation technique. Although the base snapshot and clone now have separate vvbn spaces, some of the vvbns that are used in both spaces reference the same physical blocks in the aggregate.

The present invention is directed to a clone splitting technique that enables online splitting of blocks shared between a parent vvol and a clone in accordance with a shared block splitting procedure executing on a storage system, such as storage system 420. Online splitting of shared blocks denotes allowing execution of read/write operations directed to the clone, as well as to the parent vvol, as the shared blocks are split. The clone splitting technique removes any connection between a clone and its parent vvol, thereby allowing the clone to be used as a "first-class" (i.e., full-fledged) volume. Moreover, the novel technique removes such connection while allowing both the clone and parent vvol to remain available online and writeable (accessible) to clients during the shared block splitting procedure.

As noted, a parent vvol, such as parent vvol 1205, includes a container file, such as container file 1210, having a plurality of blocks, such as inode 1212, level 1 indirect blocks 1214 and level 0 data blocks 1216. A clone, such as clone 1350, is created from a base snapshot 1235 of the parent vvol 1205 in accordance with the cloning technique described herein. The parent and clone have the same sized vbn space and, initially, all blocks (other than the modified volinfo block 1352) of container file 1340 of the clone 1350 are shared with the parent vvol 1205 (and/or base snapshot 1235). The novel clone splitting technique essentially "splits" those shared blocks between the parent vvol (base snapshot) and the clone to thereby enable the clone to become a full fledged, independent volume.

Figure 14:
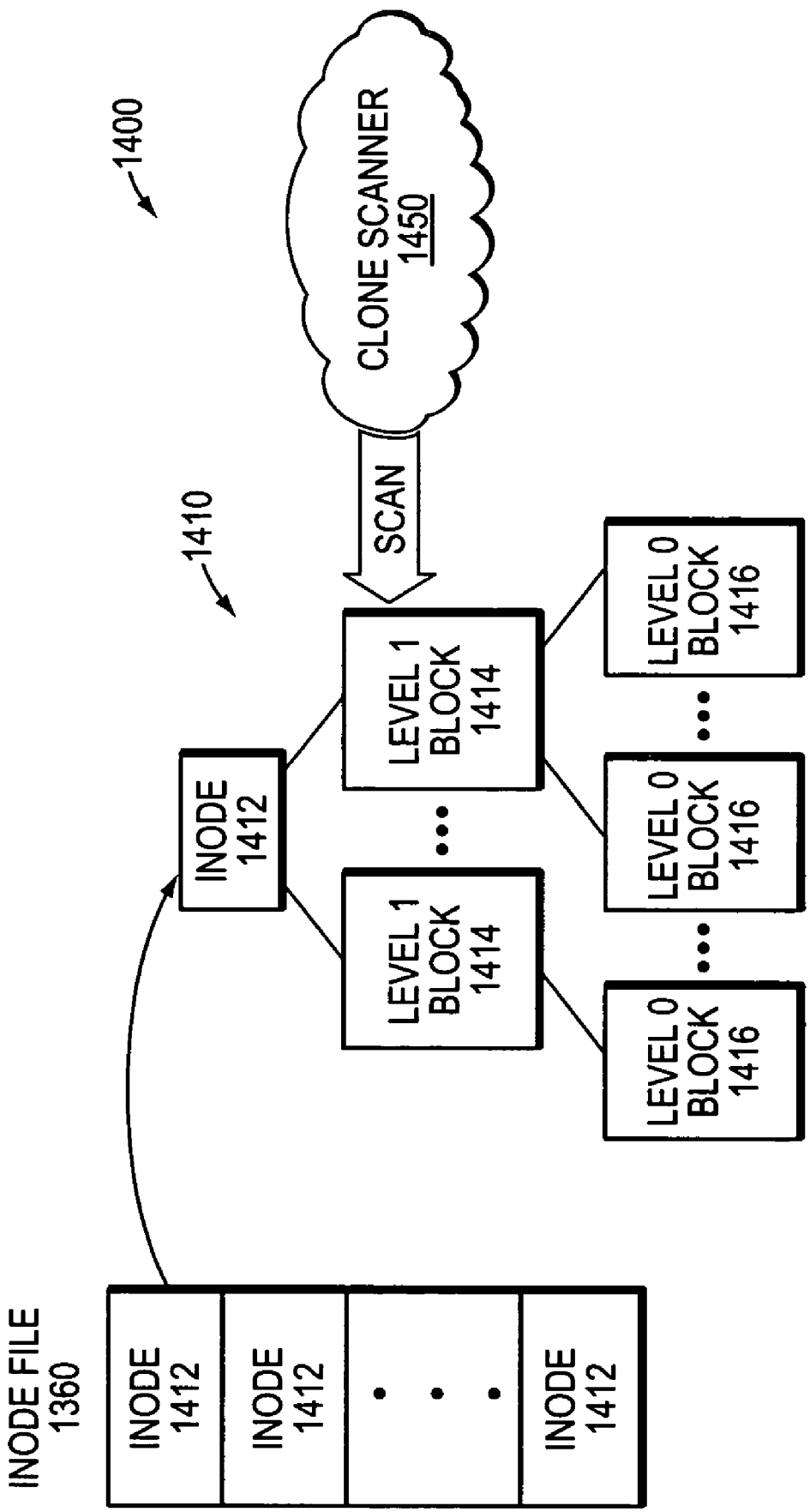
FIG. 14 is a schematic block diagram illustrating a clone splitting technique in accordance with the present invention.

FIG. 14 is a schematic block diagram illustrating the clone-splitting technique 1400 in accordance with the present invention. As also noted, the clone 1350 includes, among other things, an inode file 1360. All inodes 1412 of the file system (executing on the clone) are organized into the inode file 1360. Each inode 1412 forms the root of an inode buffer tree 1410 and contains pointers to indirect blocks, such as level 1 (L1) indirect blocks 1414 and each indirect block includes pointers to level 0 (L0) data blocks 1416. According to the inventive technique, a clone scanner 1450 scans (traverses) the entire inode buffer tree 1410 of each inode 1412 and determines whether to initiate writing of a new copy of a block used in the clone to a level 0 data block 1376 of the clone container file 1340; as described herein, this determination is dependent upon whether the block is not owned by the clone. The clone scanner 1450 is illustratively an inode-based file system scanner configured to run over an online volume, such as clone 1350, to thereby enable access to the clone during the shared block splitting procedure.

It should be noted that a clone may be created on a clone (a nesting arrangement of clones). Thus, it is not adequate to check for parent vvol ownership of a block used by the clone. Specifically, the clone splitting technique requires that the block used by the clone not be owned by the clone. Accordingly, the clone scanner 1450 efficiently examines all blocks used in the clone to determine those which are not owned by the clone 1350. Those blocks that are not owned by the clone are copied to the clone (e.g., in accordance with a copy-on-write operation) to essentially "split" the blocks shared between the parent vvol 1205 and clone 1350.

In the illustrative embodiment, the clone splitting technique is implemented as a multi-phase process comprising a first "validity checking" phase, a second "clone split scanner" phase and a third "clean-up" phase. Specifically, the first phase of the clone splitting technique involves checking the validity of the scan, including clone state. Validity checking includes ensuring that there are no pinned snapshots on the clone itself. If there are pinned snapshots, the split operation procedure is rejected because such an operation removes all snapshots and no pinned snapshots should be removed, e.g., from clones of the clone. If no errors are found, the clone transitions to a persistent "clone_split" state that allows continuation of clone splitting after an unexpected system failure, such as panic or power failure.

Figure 15:
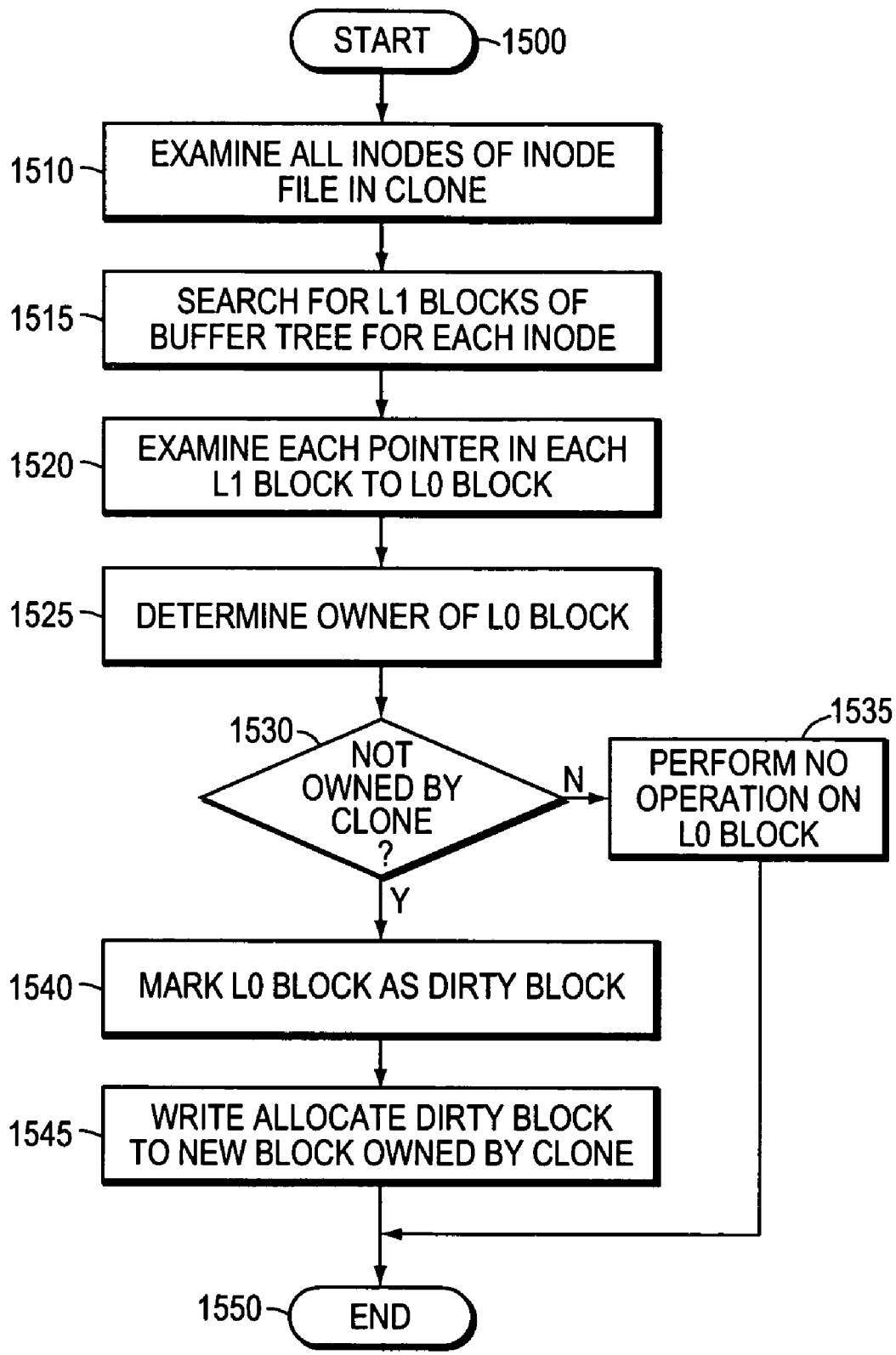
FIG. 15 is a flowchart illustrating a shared block splitting procedure in accordance with the cloning splitting technique.

The second clone split scanner phase of the clone splitting technique comprises the shared block splitting procedure for splitting blocks shared between a clone and parent vvol. FIG. 15 is a flowchart illustrating the shared block splitting procedure in accordance with the novel cloning splitting technique. The procedure starts at Step 1500 and proceeds to Step 1510 where the clone scanner scans (examines) all the inodes of the inode file in the clone and, for each inode, "walks" the inode buffer tree searching for L1 blocks (Step 1515). Upon discovering each L1 block, in Step 1520 the clone scanner examines each pointer in the L1 block to a L0 data block and, in Step 1525, determines the owner of that L0 block. The pointers are illustratively physical volume block numbers (pvbns) and the owner map 1100 in the aggregate is illustratively used to determine the owner of a particular pvbn block.

If the owner map 1100 indicates the clone is the owner of the L0 block (Step 1530), the clone scanner does not perform any further operation on that data block (Step 1535) and the procedure ends at Step 1550. However if the owner map indicates that the clone is not the owner of the L0 block, the scanner loads the block into memory 424 (buffer cache 470) and marks it as "dirty" (Step 1540). In Step 1545, a write allocator 582 of the file system 580 is invoked to write allocate the dirty block to a new block that is owned by the clone. That is, the write allocator performs a copy-on-write operation that essentially loads the dirty block into the new block without altering its data contents, thereby furthering "filling" of the container file 1340 of the clone. The procedure then ends at Step 1550.

According to an aspect of the present invention, write requests directed to the clone 1350 may be serviced during performance of the clone splitting technique in a manner that essentially facilitates the splitting of shared blocks between the parent vvol 1205 and the clone. If a client request is directed to the clone for purposes of writing a particular block during the clone split scanner phase, the clone scanner 1450 copies the block on the write operation to a new block location that is owned by the clone 1350 (instead of the parent vvol 1205). Enabling the clone to be "online" writeable during the splitting of shared blocks between the parent vvol and the clone facilitates clone splitting because, when the scanner eventually reaches the particular block, it has no work to perform. That is, the particular block has been written to a new block location owned by the clone (in accordance with the copy-on-write operation) and, thus, the work has been completed.

Splitting of blocks shared between a clone and its parent vvol may, in some cases, consume substantial disk storage space (e.g., up to 100% of the clone disk size). For a large vvol, this presents a possibility that performance of the clone splitting technique may fail due to lack of disk space. According to another aspect of the invention, a graceful handling procedure is provided that predicts the amount of disk storage space needed for completion of the block splitting procedure (i.e., copying of the blocks that are not owned by the clone to the clone), while enabling restart of the (copying) procedure in the event the predicted storage space to be consumed is not available on the storage system. Illustratively, before copying any L0 blocks referenced by each L1 block, disk space is checked to ensure there is sufficient storage capacity and, if not, the clone splitting procedure is aborted with applicable diagnostics.

After forcing divergence (splitting) of blocks shared between the clone and the parent vvol, the third clean-up phase of the clone splitting technique is performed that essentially dissolves the clone/parent vvol relationship to thereby enable the clone to transition to a full fledged, independent, non-clone volume. The clean-up phase is preferably performed in an atomic manner to, among other things, remove any snapshots and/or softlocks. In the latter case, if the parent vvol is duplicated as a read-only base snapshot replica on a target volume on a destination storage system, a clone softlock is "taken" on the parent vvol. That is, the clone softlock is propagated from the destination storage system to a source storage system to ensure that the source system does not delete the base snapshot (or parent vvol) while the clone exists. An example of a clone softlock that may be advantageously used with the present invention is described in U.S. patent application Ser. No. 10/836,112 titled, *Writable Clone of Read-Only Volume*, by R. Fair et al., filed on <date>.

As part of the clean-up phase, the clone softlock is deleted; however, if the parent vvol has transitioned offline, it cannot be accessed and that softlock cannot be removed. As a result, the resulting full fledged independent volume is maintained as a clone, at least temporarily; otherwise the softlock will "hang" which is undesirable. To that end, the clone is initially marked in core (in memory) as "not being split" from its parent vvol and that state is written out to disk. Thereafter, the clone is marked in core as "not being a clone" and that last state is written out to disk. Therefore, if a failure occurs at any point up to the last marked state, the clone is still a clone, even though all of its shared blocks have been split from the parent vvol.

While there has been shown and described an illustrative embodiment of a clone splitting technique that enables efficient online splitting of blocks shared between a parent vvol and a clone, it is to be understood that various other adaptations and modifications may be made within the spirit and scope of the invention. For example, according to yet another aspect of the inventive technique, splitting of shared blocks is performed in a manner that preserves "holes" where possible, while still ensuring that all blocks of a buffer tree are copied. The illustrative WAFL file system supports sparse files, i.e., files having blocks that do not exist on disk; a hole denotes a L0 data block that does not exist on a storage device, such as a disk. An optimization to the clone splitting technique marks as dirty those L0 blocks that are not owned by the clone and that are not holes. This optimization attempts to not "fill" holes (e.g., with data blocks) so as to maintain the sparse nature of files in the clone. However, an exception involves the first L0 block in each L1 block which, if a hole, is filled to ensure that the L1 buffer tree is copied.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software (including a computer-readable medium having program instructions executing on a computer), hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system configured to enable efficient online splitting of blocks shared between a parent volume and a clone of a storage system, the system comprising:

a clone scanner executing on the storage system, the clone scanner adapted to examine all blocks used in the clone to determine those blocks that are not owned by the clone;

an inode file of the clone that has pointers to one or more blocks in the parent volume and one or more blocks in the clone, the inode file adapted to organize all inodes of a file system executing on the clone, wherein each inode of the inode file forms a root of an inode buffer tree and contains pointers to indirect blocks, each indirect block including pointers to data blocks;

the clone scanner is further adapted to scan the inode buffer tree of each inode and determine whether to initiate writing of a new copy of a block used in the clone depending upon whether the block is not owned by the clone; and a write allocator executing on the storage system, the write allocator adapted to copy those blocks that are not owned by the clone to the clone, to thereby split the blocks shared between the parent volume and clone, wherein the write allocator performs a copy-on-write operation that loads the blocks that are not owned by the clone into new blocks that are owned by the clone, without altering any data contents of the blocks.

2. The system of claim 1 wherein the clone scanner is an inode-based file system scanner configured to run over an online volume, such as the clone.

3. The system of claim 1 wherein the parent volume is a parent virtual volume (vvol) of an aggregate on the storage system.

4. A method for enabling efficient online splitting of blocks shared between a parent volume and a clone of a storage system, comprising:
   examining all inodes of an inode file in the clone, where the inodes point to one or more blocks in the parent volume and one or more blocks in the clone;
   for each inode, traversing all level 1 blocks of an inode buffer tree in the clone;
   searching for all level 0 blocks that are not owned by the clone by using an owner map to determine whether the level 0 blocks are owned by the parent volume or the clone;
   upon finding any level 0 blocks that are not owned by the clone, marking those blocks as dirty those blocks that are not owned by the clone and that are not holes, wherein a hole denotes a level 0 block that does not exist on a storage device; and
   copying those blocks that are not owned by the clone to the clone, to thereby split the blocks shared between the parent volume and clone by loading the dirty blocks into is new blocks owned by the clone without altering their data contents.

5. The method of claim 4 wherein the storage device is a disk.

6. The method of claim 4 further comprising:
   predicting an amount of storage space needed to copy the blocks that are not owned by the clone to the clone; and
   restarting the step of copying in the event the predicted storage space to be consumed is not available on the storage system.

7. The method of claim 4 further comprising, after splitting the blocks shared between the parent volume and clone, dissolving a clone/parent volume relationship to thereby enable the clone to transition to a full fledged volume.

8. The method of claim 7 wherein the step of dissolving comprises removing any snapshots and/or softlocks.

9. Apparatus adapted to enable efficient online splitting of blocks shared between a parent volume and a clone of a storage system, the apparatus comprising:
   means for examining all inodes of an inode file in the clone, where the inodes point to one or more blocks in the parent volume and one or more blocks in the clone;
   for each inode, means for traversing all level 1 blocks of an inode buffer tree in the clone;
   means for searching for all level 0 blocks that are not owned by the clone;
   upon finding any level 0 blocks that are not owned by the clone, means for marking those blocks as dirty; and
   means for copying those blocks that are not owned by the clone to the clone, to thereby split the blocks shared between the parent volume and clone.

10. A computer readable medium containing executable program instructions for enabling efficient online splitting of blocks shared between a parent volume and a clone of a storage system, the executable instructions comprising one or more program instructions for:
   examining all inodes of an inode file in the clone, where the inodes point to one or more blocks in the parent volume and one or more blocks in the clone;
   for each inode, traversing all level 1 blocks of an inode buffer tree in the clone;
   searching for all level 0 blocks that are not owned by the clone;
   upon finding any level 0 blocks that are not owned by the clone, marking those blocks as dirty; and
   copying those blocks that are not owned by the clone to the clone, to thereby split the blocks shared between the parent volume and clone.

11. A storage system, comprising:
   an aggregate configured to organize a plurality of blocks into a global storage space from a plurality of disks, the aggregate further including a parent virtual volume and a clone, where the clone is a read write copy of the parent virtual volume and the clone shares access with one or more blocks of the parent virtual volume using a modified volume information block that points to one or more blocks in the parent virtual volume and one or more blocks in the clone;
   a clone scanner operating with the storage system, the clone scanner adapted to examine blocks used in the clone to determine those blocks that are shared by the clone with the parent virtual volume; and
   a write allocator executing on the storage system, the write allocator adapted to copy those blocks that are shared by the clone with the parent virtual volume to the clone, to thereby split the blocks shared between the parent virtual volume and clone.

12. The system of claim 11, wherein the write allocator performs a copy-on-write operation that loads the blocks that are shared by the clone with the parent virtual volume into new blocks that are not shared by the clone, without altering any data contents of the blocks.

13. The system of claim 11, further comprising an inode file of the clone, the inode file adapted to organize all inodes of a file system executing on the clone.

14. The system of claim 13, wherein each inode of the inode file forms a root of an inode buffer tree and contains pointers to indirect blocks, each indirect block including pointers to data blocks.

15. The system of claim 14, wherein the clone scanner is adapted to scan the inode buffer tree of each inode and determine whether to initiate writing of a new copy of a block used in the clone depending upon whether the block is shared by the clone with the parent virtual volume.

16. The system of claim 15, wherein the clone scanner is an inode-based file system scanner configured to run over an online virtual volume, such as the clone.

17. A computer-implemented method, comprising:
   organizing a parent virtual volume and a clone within an aggregate, where the aggregate organizes a plurality of blocks into a global storage space from a plurality of disks, and where the clone is a read write copy of the parent virtual volume with the clone sharing access to one or more blocks of the parent virtual volume using a modified volume information block that points to one or more blocks in the parent virtual volume and one or more blocks in the clone;
   examining blocks used in the clone to determine those blocks that are shared by the clone with the parent virtual volume; and copying those blocks that are shared by the clone with the parent virtual volume to the clone, to thereby split the blocks shared between the parent virtual volume and clone.

18. The method of claim 17, wherein the step of examining comprises:
   examining all inodes of an inode file in the clone;
   for each inode, traversing all level 1 blocks of an inode buffer tree in the clone;
   searching for all level 0 blocks that are shared by the clone with the parent virtual volume; and
   upon finding any level 0 blocks that are shared by the clone with the parent virtual volume, marking those blocks as dirty.

19. The method of claim 18, wherein the step of searching comprises using an owner map to determine whether the level 0 blocks are owned by the parent virtual volume or the clone.

20. The method of claim 18 wherein the step of copying comprises loading the dirty blocks into new blocks not shared by the clone without altering their data contents.

21. The method of claim 18, wherein the step of marking comprises marking as dirty those blocks that are shared by the clone with the parent virtual volume and that are not holes, wherein a hole denotes a level 0 block that does not exist on a storage device.

22. The method of claim 21, wherein the storage device is a disk.

23. The method of claim 17, further comprising:
   predicting an amount of storage space needed to copy the blocks that are shared by the clone with the parent virtual volume to the clone; and
   restarting the step of copying in the event the predicted storage space to be consumed is not available on the storage system.

24. The method of claim 17 further comprising, after splitting the blocks shared between the parent virtual volume and clone, dissolving a clone/parent virtual volume relationship to thereby enable the clone to transition to a full fledged virtual volume.

25. The method of claim 24 wherein the step of dissolving comprises removing any snapshots and/or softlocks.

26. A method, comprising:
   organizing a parent virtual volume and a clone within an aggregate, where the aggregate organizes a plurality of blocks into a global storage space from a plurality of disks, and where the clone is a read write copy of the parent virtual volume, wherein the clone uses a modified volume information block that points to one or more blocks in the parent virtual volume and one or more blocks in the clone;
   examining blocks used in the clone to determine those blocks that are shared by the clone with the parent virtual volume; and
   copying those blocks that are shared by the clone with the parent virtual volume to the clone, to thereby split the blocks shared between the parent virtual volume and clone.

27. The method of claim 26, wherein the modified volume block is a modified version of a volume information block stored within the parent virtual volume.

28. The method of claim 26, further comprising:
   after splitting the blocks shared between the parent virtual volume and clone, dissolving a clone/parent virtual volume relationship to thereby enable the clone to transition to a full fledged virtual volume.

29. The method of claim 28, wherein dissolving comprises removing any snapshots and/or softlocks.

* * * * *